(12) United States Patent
Al-Mousa et al.

(10) Patent No.: US 11,598,178 B2
(45) Date of Patent: Mar. 7, 2023

(54) WELLBORE MUD PIT SAFETY SYSTEM

(71) Applicant: Saudi Arabian Oil Company, Dhahran (SA)

(72) Inventors: Ahmed Al-Mousa, Dhahran (SA); Omar M Alhamid, Dammam (SA); Marius Neacsu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/144,824

(22) Filed: Jan. 8, 2021

(65) Prior Publication Data
US 2022/0220829 A1 Jul. 14, 2022

(51) Int. Cl.
| | | |
|---|---|---|
| *E21B 41/00* | (2006.01) | |
| *G08B 21/08* | (2006.01) | |
| *H04M 1/72421* | (2021.01) | |
| *G06V 20/13* | (2022.01) | |
| *B63C 9/00* | (2006.01) | |
| *G08B 21/02* | (2006.01) | |

(52) U.S. Cl.
CPC ........ *E21B 41/0021* (2013.01); *B63C 9/0005* (2013.01); *G06V 20/13* (2022.01); *G08B 21/02* (2013.01); *G08B 21/08* (2013.01); *G08B 21/084* (2013.01); *G08B 21/086* (2013.01); *H04M 1/72421* (2021.01)

(58) Field of Classification Search
CPC . E02B 3/041; E02D 19/22; E04H 5/02; G01F 23/0007
See application file for complete search history.

(56) References Cited

U.S. PATENT DOCUMENTS

| | | |
|---|---|---|
| 880,404 A | 2/1908 | Sanford |
| 1,033,655 A | 7/1912 | Baker |
| (Continued) | | |

FOREIGN PATENT DOCUMENTS

| | | |
|---|---|---|
| AU | 636642 | 5/1993 |
| AU | 2007249417 | 11/2007 |
| (Continued) | | |

OTHER PUBLICATIONS

Al-Ansari et al., "Thermal Activated Resin to Avoid Pressure Build-Up in Casing-Casing Annulus (CCA)," SA-175425-MS, Society of Petroleum Engineers (SPE), presented at the SPE Offshore Europe Conference and Exhibition, Sep. 8-11, 2015, 11 pages.
(Continued)

*Primary Examiner* — Mirza F Alam
(74) *Attorney, Agent, or Firm* — Fish & Richardson P.C.

(57) ABSTRACT

A fluid pit safety system is disclosed to prevent drowning incidents in a fluid pit filled with a fluid. The system comprises a plurality of sensors spatially disposed adjacent the fluid pit, a perimeter detection sub-system defining a perimeter arranged around an edge of the fluid pit, and a rescue device arranged in the fluid pit. The plurality of sensors are configured to detect a change in fluid height in the fluid pit. The perimeter detection sub-system is configured to detect a disruption in the perimeter. The rescue device is configured to move towards a surface of the fluid in the fluid pit in response to the plurality of sensors detecting the change in the fluid height in the fluid pit and the perimeter detection sub-system detecting the disruption in the perimeter.

29 Claims, 10 Drawing Sheets

(56) References Cited

U.S. PATENT DOCUMENTS

| | | |
|---|---|---|
| 1,258,273 A | 3/1918 | Titus et al. |
| 1,392,650 A | 10/1921 | Mcmillian |
| 1,491,066 A | 4/1924 | Patrick |
| 1,580,352 A | 4/1926 | Ercole |
| 1,591,264 A | 7/1926 | Baash |
| 1,621,947 A | 3/1927 | Moore |
| 1,638,494 A | 8/1927 | Lewis et al. |
| 1,789,993 A | 1/1931 | Switzer |
| 1,796,762 A | 3/1931 | Paston |
| 1,896,236 A | 2/1933 | Howard |
| 1,896,482 A | 2/1933 | Crowell |
| 1,897,297 A | 2/1933 | Brown |
| 1,949,498 A | 3/1934 | Frederick et al. |
| 2,047,774 A | 7/1936 | Greene |
| 2,121,002 A | 6/1938 | Baker |
| 2,121,051 A | 6/1938 | Ragan et al. |
| 2,187,487 A | 1/1940 | Burt |
| 2,189,697 A | 2/1940 | Baker |
| 2,222,233 A | 11/1940 | Mize |
| 2,286,075 A | 6/1942 | Evans |
| 2,304,793 A | 12/1942 | Bodine |
| 2,316,402 A | 4/1943 | Canon |
| 2,327,092 A | 8/1943 | Botkin |
| 2,377,249 A | 5/1945 | Lawrence |
| 2,411,260 A | 11/1946 | Glover et al. |
| 2,481,637 A | 9/1949 | Yancey |
| 2,546,978 A | 4/1951 | Collins et al. |
| 2,638,988 A | 5/1953 | Williams |
| 2,663,370 A | 12/1953 | Robert et al. |
| 2,672,199 A | 3/1954 | McKenna |
| 2,701,019 A | 2/1955 | Steed |
| 2,707,998 A | 5/1955 | Baker et al. |
| 2,708,973 A | 5/1955 | Twining |
| 2,728,599 A | 12/1955 | Moore |
| 2,734,581 A | 2/1956 | Bonner |
| 2,745,693 A | 5/1956 | Mcgill |
| 2,751,010 A | 6/1956 | Trahan |
| 2,762,438 A | 9/1956 | Naylor |
| 2,778,428 A | 1/1957 | Baker et al. |
| 2,806,532 A | 9/1957 | Baker et al. |
| 2,881,838 A | 4/1959 | Morse et al. |
| 2,887,162 A | 5/1959 | Le Bus et al. |
| 2,912,053 A | 11/1959 | Bruekelman |
| 2,912,273 A | 11/1959 | Chadderdon et al. |
| 2,915,127 A | 12/1959 | Abendroth |
| 2,947,362 A | 8/1960 | Smith |
| 2,965,175 A | 12/1960 | Ransom |
| 2,965,177 A | 12/1960 | Le Bus et al. |
| 2,965,183 A | 12/1960 | Le Bus et al. |
| 3,005,506 A | 10/1961 | Le Bus et al. |
| 3,023,810 A | 3/1962 | Anderson |
| 3,116,799 A | 1/1964 | Lemons |
| 3,147,536 A | 9/1964 | Lamphere |
| 3,225,828 A | 12/1965 | Wisenbaker et al. |
| 3,308,886 A | 3/1967 | Evans |
| 3,352,593 A | 11/1967 | Webb |
| 3,369,603 A | 2/1968 | Trantham |
| 3,376,934 A | 4/1968 | William |
| 3,380,528 A | 4/1968 | Durwood |
| 3,381,748 A | 5/1968 | Peters et al. |
| 3,382,925 A | 5/1968 | Jennings |
| 3,437,136 A | 4/1969 | Young |
| 3,667,721 A | 6/1972 | Vujasinovic |
| 3,747,674 A | 7/1973 | Murray |
| 3,752,230 A | 8/1973 | Bernat et al. |
| 3,897,038 A | 7/1975 | Le Rouax |
| 3,915,426 A | 10/1975 | Le Rouax |
| 4,030,354 A | 6/1977 | Scott |
| 4,039,798 A | 8/1977 | Lyhall et al. |
| 4,042,019 A | 8/1977 | Henning |
| 4,059,155 A | 11/1977 | Greer |
| 4,099,699 A | 7/1978 | Allen |
| 4,190,112 A | 2/1980 | Davis |
| 4,227,573 A | 10/1980 | Pearce et al. |
| 4,254,983 A | 3/1981 | Harris |
| 4,276,931 A | 7/1981 | Murray |
| 4,296,822 A | 10/1981 | Ormsby |
| 4,349,071 A | 9/1982 | Fish |
| 4,391,326 A | 7/1983 | Greenlee |
| 4,407,367 A | 10/1983 | Kydd |
| 4,412,130 A | 10/1983 | Winters |
| 4,413,642 A | 11/1983 | Smith et al. |
| 4,422,948 A | 12/1983 | Corley et al. |
| 4,467,996 A | 8/1984 | Baugh |
| 4,515,212 A | 5/1985 | Krugh |
| 4,538,684 A | 9/1985 | Sheffield |
| 4,562,888 A | 1/1986 | Collet |
| 4,603,578 A | 8/1986 | Stolz |
| 4,616,721 A | 10/1986 | Furse |
| 4,696,502 A | 9/1987 | Desai |
| 4,834,184 A | 5/1989 | Streich et al. |
| 4,836,289 A | 6/1989 | Young |
| 4,869,321 A | 9/1989 | Hamilton |
| 4,877,085 A | 10/1989 | Pullig, Jr. |
| 4,898,245 A | 2/1990 | Braddick |
| 4,928,762 A | 5/1990 | Mamke |
| 4,953,617 A | 9/1990 | Ross et al. |
| 4,997,225 A | 3/1991 | Denis |
| 5,012,863 A | 5/1991 | Springer |
| 5,054,833 A | 10/1991 | Bishop et al. |
| 5,060,737 A | 10/1991 | Mohn |
| 5,117,909 A | 6/1992 | Wilton et al. |
| 5,129,956 A | 7/1992 | Christopher et al. |
| 5,176,208 A | 1/1993 | Lalande et al. |
| 5,178,219 A | 1/1993 | Streich et al. |
| 5,197,547 A | 3/1993 | Morgan |
| 5,203,646 A | 4/1993 | Landsberger et al. |
| 5,295,541 A | 3/1994 | Ng et al. |
| 5,330,000 A | 7/1994 | Givens et al. |
| 5,358,048 A | 10/1994 | Brooks |
| 5,392,715 A | 2/1995 | Pelrine |
| 5,456,312 A | 10/1995 | Lynde et al. |
| 5,507,346 A | 4/1996 | Gano et al. |
| 5,580,114 A | 12/1996 | Palmer |
| 5,584,342 A | 12/1996 | Swinford |
| 5,605,366 A | 2/1997 | Beeman |
| 5,639,135 A | 6/1997 | Beeman |
| 5,667,015 A | 9/1997 | Harestad et al. |
| 5,673,754 A | 10/1997 | Taylor |
| 5,678,635 A | 10/1997 | Dunlap et al. |
| 5,685,982 A | 11/1997 | Foster |
| 5,806,596 A | 9/1998 | Hardy et al. |
| 5,832,547 A | 11/1998 | Burroughs |
| 5,833,001 A | 11/1998 | Song et al. |
| 5,842,518 A | 12/1998 | Soybel et al. |
| 5,881,816 A | 3/1999 | Wright |
| 5,924,489 A | 7/1999 | Hatcher |
| 5,944,101 A | 8/1999 | Hearn |
| 6,070,665 A | 6/2000 | Singleton et al. |
| 6,112,809 A | 9/2000 | Angle |
| 6,130,615 A | 10/2000 | Poteet |
| 6,138,764 A | 10/2000 | Scarsdale et al. |
| 6,155,428 A | 12/2000 | Bailey et al. |
| 6,247,542 B1 | 6/2001 | Kruspe et al. |
| 6,276,452 B1 | 8/2001 | Davis et al. |
| 6,371,204 B1 | 4/2002 | Singh et al. |
| 6,378,627 B1 | 4/2002 | Tubel et al. |
| 6,491,108 B1 | 12/2002 | Slup et al. |
| 6,510,947 B1 | 1/2003 | Schulte et al. |
| 6,595,289 B2 | 7/2003 | Tumlin et al. |
| 6,637,511 B2 | 10/2003 | Linaker |
| 6,679,330 B1 | 1/2004 | Compton et al. |
| 6,688,386 B2 | 2/2004 | Comelssen |
| 6,698,712 B2 | 3/2004 | Milberger et al. |
| 6,729,392 B2 | 5/2004 | DeBerry et al. |
| 6,768,106 B2 | 7/2004 | Gzara et al. |
| 6,808,023 B2 | 10/2004 | Smith et al. |
| 6,811,032 B2 | 11/2004 | Schulte et al. |
| 6,880,639 B2 | 4/2005 | Rhodes et al. |
| 6,899,178 B2 | 5/2005 | Tubel |
| 6,913,084 B2 | 7/2005 | Boyd |
| 7,049,272 B2 | 5/2006 | Sinclair et al. |
| 7,051,810 B2 | 5/2006 | Halliburton |
| 7,096,950 B2 | 8/2006 | Howlett et al. |

(56) References Cited

U.S. PATENT DOCUMENTS

| | | |
|---|---|---|
| 7,117,956 B2 | 10/2006 | Grattan et al. |
| 7,150,328 B2 | 12/2006 | Marketz et al. |
| 7,188,674 B2 | 3/2007 | McGavern, III et al. |
| 7,188,675 B2 | 3/2007 | Reynolds |
| 7,218,235 B1 | 5/2007 | Rainey |
| 7,231,975 B2 | 6/2007 | Lavaure et al. |
| 7,249,633 B2 | 7/2007 | Ravensbergen et al. |
| 7,275,591 B2 | 10/2007 | Allen et al. |
| 7,284,611 B2 | 10/2007 | Reddy et al. |
| 7,303,010 B2 | 12/2007 | de Guzman et al. |
| 7,398,832 B2 | 7/2008 | Brisco |
| 7,405,182 B2 | 7/2008 | Verrett |
| 7,418,860 B2 | 9/2008 | Austerlitz et al. |
| 7,424,909 B2 | 9/2008 | Roberts et al. |
| 7,488,705 B2 | 2/2009 | Reddy et al. |
| 7,497,260 B2 | 3/2009 | Telfer |
| 7,591,305 B2 | 9/2009 | Brookey et al. |
| 7,600,572 B2 | 10/2009 | Slup et al. |
| 7,617,876 B2 | 11/2009 | Patel et al. |
| 7,621,324 B2 | 11/2009 | Atencio |
| 7,712,527 B2 | 5/2010 | Roddy |
| 7,735,564 B2 | 6/2010 | Guerrero |
| 7,762,323 B2 | 7/2010 | Frazier |
| 7,802,621 B2 | 9/2010 | Richards et al. |
| 7,934,552 B2 | 5/2011 | La Rovere |
| 7,965,175 B2 | 6/2011 | Yamano |
| 8,002,049 B2 | 8/2011 | Keese et al. |
| 8,056,621 B2 | 11/2011 | Ring et al. |
| 8,069,916 B2 | 12/2011 | Giroux et al. |
| 8,201,693 B2 | 6/2012 | Jan |
| 8,210,251 B2 | 7/2012 | Lynde et al. |
| 8,376,051 B2 | 2/2013 | McGrath et al. |
| 8,453,724 B2 | 6/2013 | Zhou |
| 8,496,055 B2 | 7/2013 | Mootoo et al. |
| 8,579,024 B2 | 11/2013 | Mailand et al. |
| 8,596,463 B2 | 12/2013 | Burkhard |
| 8,726,983 B2 | 5/2014 | Khan |
| 8,770,276 B1 | 7/2014 | Nish et al. |
| 8,899,338 B2 | 12/2014 | Elsayed et al. |
| 8,991,489 B2 | 3/2015 | Redlinger et al. |
| 9,079,222 B2 | 7/2015 | Burnett et al. |
| 9,109,433 B2 | 8/2015 | DiFoggio et al. |
| 9,133,671 B2 | 9/2015 | Kellner |
| 9,163,469 B2 | 10/2015 | Broussard et al. |
| 9,181,782 B2 | 11/2015 | Berube et al. |
| 9,212,532 B2 | 12/2015 | Leuchtenberg et al. |
| 9,234,394 B2 | 1/2016 | Wheater et al. |
| 9,359,861 B2 | 6/2016 | Burgos |
| 9,410,066 B2 | 8/2016 | Ghassemzadeh |
| 9,416,617 B2 | 8/2016 | Wiese et al. |
| 9,551,200 B2 | 1/2017 | Read et al. |
| 9,574,417 B2 | 2/2017 | Laird et al. |
| 9,657,213 B2 | 5/2017 | Murphy et al. |
| 9,976,407 B2 | 5/2018 | Ash et al. |
| 10,087,752 B2 | 10/2018 | Bedonet |
| 10,198,929 B2 | 2/2019 | Snyder |
| 10,266,698 B2 | 4/2019 | Cano et al. |
| 10,280,706 B1 | 5/2019 | Sharp, III |
| 10,301,898 B2 | 5/2019 | Orban |
| 10,301,989 B2 | 5/2019 | Imada |
| 10,584,546 B1 | 3/2020 | Ford |
| 10,626,698 B2 | 4/2020 | Al-Mousa et al. |
| 10,837,254 B2 | 11/2020 | Al-Mousa et al. |
| 2002/0053428 A1 | 5/2002 | Maples |
| 2003/0047312 A1 | 3/2003 | Bell |
| 2003/0098064 A1 | 5/2003 | Kohli et al. |
| 2003/0132224 A1 | 7/2003 | Spencer |
| 2004/0040707 A1 | 3/2004 | Dusterhoft et al. |
| 2004/0065446 A1 | 4/2004 | Tran et al. |
| 2004/0074819 A1 | 4/2004 | Burnett |
| 2004/0095248 A1 | 5/2004 | Mandel |
| 2005/0056427 A1 | 3/2005 | Clemens et al. |
| 2005/0167097 A1 | 8/2005 | Sommers et al. |
| 2005/0263282 A1 | 12/2005 | Jeffrey et al. |
| 2006/0082462 A1 | 4/2006 | Crook |
| 2006/0105896 A1 | 5/2006 | Smith et al. |
| 2007/0137528 A1 | 6/2007 | Le Roy-Ddelage et al. |
| 2007/0181304 A1 | 8/2007 | Rankin et al. |
| 2007/0204999 A1 | 9/2007 | Cowie et al. |
| 2007/0256867 A1 | 11/2007 | DeGeare et al. |
| 2008/0087439 A1 | 4/2008 | Dallas |
| 2008/0236841 A1 | 10/2008 | Howlett et al. |
| 2008/0251253 A1 | 10/2008 | Lumbye |
| 2008/0314591 A1 | 12/2008 | Hales et al. |
| 2009/0194290 A1 | 8/2009 | Parks et al. |
| 2009/0250220 A1 | 10/2009 | Stamoulis |
| 2010/0162812 A1* | 7/2010 | Parkinson ............ G01F 23/185 |
| | | 73/299 |
| 2010/0176956 A1 | 7/2010 | Moerschell |
| 2010/0258289 A1 | 10/2010 | Lynde et al. |
| 2010/0263856 A1 | 10/2010 | Lynde et al. |
| 2010/0270018 A1 | 10/2010 | Howlett |
| 2011/0036570 A1 | 2/2011 | La Rovere et al. |
| 2011/0056681 A1 | 3/2011 | Khan |
| 2011/0067869 A1 | 3/2011 | Bour et al. |
| 2011/0168411 A1 | 7/2011 | Braddick |
| 2011/0203794 A1 | 8/2011 | Moffitt et al. |
| 2011/0259609 A1 | 10/2011 | Hessels et al. |
| 2011/0273291 A1 | 11/2011 | Adams |
| 2011/0278021 A1 | 11/2011 | Travis et al. |
| 2012/0012335 A1 | 1/2012 | White et al. |
| 2012/0067447 A1 | 3/2012 | Ryan et al. |
| 2012/0118571 A1 | 5/2012 | Zhou |
| 2012/0170406 A1 | 7/2012 | DiFoggio et al. |
| 2012/0285684 A1 | 11/2012 | Crow et al. |
| 2013/0134704 A1 | 5/2013 | Klimack |
| 2013/0213654 A1 | 8/2013 | Dewey et al. |
| 2013/0240207 A1 | 9/2013 | Frazier |
| 2013/0269097 A1 | 10/2013 | Alammari |
| 2013/0296199 A1 | 11/2013 | Ghassemzadeh |
| 2014/0138091 A1 | 5/2014 | Fuhst |
| 2014/0158350 A1 | 6/2014 | Castillo et al. |
| 2014/0231068 A1 | 8/2014 | Isaksen |
| 2014/0251616 A1 | 9/2014 | O'Rourke et al. |
| 2015/0013994 A1 | 1/2015 | Bailey et al. |
| 2015/0047132 A1* | 2/2015 | Sveum ............... B65G 69/2823 |
| | | 14/71.1 |
| 2015/0096738 A1 | 4/2015 | Atencio |
| 2016/0076327 A1 | 3/2016 | Glaser et al. |
| 2016/0084034 A1 | 3/2016 | Roane et al. |
| 2016/0130914 A1 | 5/2016 | Steele |
| 2016/0160106 A1 | 6/2016 | Jamison et al. |
| 2016/0237810 A1 | 8/2016 | Beaman et al. |
| 2016/0281458 A1 | 9/2016 | Greenlee |
| 2016/0305215 A1 | 10/2016 | Harris et al. |
| 2016/0340994 A1 | 11/2016 | Ferguson et al. |
| 2017/0044864 A1 | 2/2017 | Sabins et al. |
| 2017/0058628 A1 | 3/2017 | Wijk et al. |
| 2017/0067313 A1 | 3/2017 | Connell et al. |
| 2017/0089166 A1 | 3/2017 | Sullivan |
| 2018/0010418 A1 | 1/2018 | VanLue |
| 2018/0030809 A1 | 2/2018 | Harestad et al. |
| 2018/0080318 A1 | 3/2018 | Schexnaider et al. |
| 2018/0187498 A1 | 7/2018 | Soto et al. |
| 2018/0209565 A1 | 7/2018 | Lingnau |
| 2018/0245427 A1 | 8/2018 | Jimenez et al. |
| 2018/0252069 A1 | 9/2018 | Abdollah et al. |
| 2019/0024473 A1 | 1/2019 | Arefi |
| 2019/0049017 A1 | 2/2019 | McAdam et al. |
| 2019/0087548 A1 | 3/2019 | Bennett et al. |
| 2019/0186232 A1 | 6/2019 | Ingram |
| 2019/0203551 A1 | 7/2019 | Davis et al. |
| 2019/0284894 A1 | 9/2019 | Schmidt et al. |
| 2019/0284898 A1 | 9/2019 | Fagna et al. |
| 2019/0316424 A1 | 10/2019 | Robichaux et al. |
| 2019/0338615 A1 | 11/2019 | Landry |
| 2019/0375486 A1* | 12/2019 | Beckman ................ B63C 9/18 |
| 2020/0032604 A1 | 1/2020 | Al-Ramadhan |
| 2020/0056446 A1 | 2/2020 | Al-Mousa et al. |

(56) References Cited

U.S. PATENT DOCUMENTS

| | | | |
|---|---|---|---|
| 2021/0180449 A1* | 6/2021 | Jamison | E21B 49/08 |
| 2021/0215036 A1* | 7/2021 | Heath | E21B 47/12 |

FOREIGN PATENT DOCUMENTS

| | | |
|---|---|---|
| CA | 2441138 | 3/2004 |
| CA | 2734032 | 6/2016 |
| CN | 203292820 | 11/2013 |
| CN | 103785923 | 6/2016 |
| CN | 104712320 | 12/2016 |
| CN | 107060679 | 8/2017 |
| CN | 107191152 | 9/2017 |
| CN | 107227939 | 10/2017 |
| DK | 2545245 | 4/2017 |
| DK | 2236742 | 8/2017 |
| EP | 2964874 | 1/2016 |
| EP | 2545245 | 4/2017 |
| GB | 958734 | 5/1964 |
| GB | 2392183 | 2/2004 |
| GB | 2414586 | 11/2005 |
| GB | 2425138 | 10/2006 |
| GB | 2453279 | 1/2009 |
| GB | 2492663 | 1/2014 |
| OA | 5503 A | 4/1981 |
| WO | WO 1989012728 | 12/1989 |
| WO | WO 1996039570 | 12/1996 |
| WO | WO 2002090711 | 11/2002 |
| WO | WO 2010132807 | 11/2010 |
| WO | WO 2012164023 | 12/2012 |
| WO | WO 2013109248 | 7/2013 |
| WO | WO 2015112022 | 7/2015 |
| WO | WO 2016011085 | 1/2016 |
| WO | WO 2016040310 | 3/2016 |
| WO | WO 2016140807 | 9/2016 |
| WO | WO 2017043977 | 3/2017 |
| WO | WO 2018017104 | 1/2018 |
| WO | WO 2018164680 | 9/2018 |
| WO | WO 2019027830 | 2/2019 |
| WO | WO 2019132877 | 7/2019 |
| WO | WO 2019231679 | 12/2019 |

OTHER PUBLICATIONS

Al-Ibrahim et al., "Automated Cyclostratigraphic Analysis in Carbonate Mudrocks Using Borehole Images," Article #41425, posted presented at the 2014 AAPG Annual Convention and Exhibition, Search and Discovery, Apr. 6-9, 2014, 4 pages.

Bautista et al., "Probability-based Dynamic TimeWarping for Gesture Recognition on RGB-D data," WDIA 2012: Advances in Depth Image Analysis and Application, 126-135, International Workshop on Depth Image Analysis and Applications, 2012, 11 pages.

Boriah et al., "Similarity Measures for Categorical Data: A Comparative Evaluation," presented at the SIAM International Conference on Data Mining, SDM 2008, Apr. 24-26, 2008, 12 pages.

Bruton et al., "Whipstock Options for Sidetracking," Oilfield Review, Spring 2014, 26:1, 10 pages.

Edwards et al., "Assessing Uncertainty in Stratigraphic Correlation: A Stochastic Method Based on Dynamic Time Warping," RM13, Second EAGE Integrated Reservoir Modelling Conference, Nov. 16-19, 2014, 2 pages.

Edwards, "Constructionde modèles stratigraphiques è partir de données éparses," Stratigraphie, Université de Lorraine, 2017, 133 pages, English abstract.

Fischer, "The Lofer Cyclothems of the Alpine Triassic," published in Merriam, Symposium on Cyclic Sedimentation: Kansas Geological Survey (KGS), Bulletin, 1964, 169: 107-149, 50 pages.

Hernandez-Vela et al., "Probability-based Dynamic Time Warping and Bag-of-Visual-and-Depth-Words for human Gesture Recognition in RGB-D," Pattern Recognition Letters, 2014, 50: 112-121, 10 pages.

Herrera and Bann, "Guided seismic-to-well tying based on dynamic time warping," SEG Las Vegas 2012 Annual Meeting, Nov. 2012, 6 pages.

Keogh and Ratanamahatana, "Exact indexing of dynamic time warping," Knowledge and Information Systems, Springer-Verlag London Ltd., 2004, 29 pages.

Lallier et al., "3D Stochastic Stratigraphic Well Correlation of Carbonate Ramp Systems," IPTC 14046, International Petroleum Technology Conference (IPTC), presented at the International Petroleum Technology Conference, Dec. 7-9, 2009, 5 pages.

Lallier et al., "Management of ambiguities in magneto stratigraphic correlation," Earth and Planetary Science Letters, 2013, 371-372: 26-36, 11 pages.

Lallier et al., "Uncertainty assessment in the stratigraphic well correlation of a carbonate ramp: Method and application of the Beausset Basin, SE France," C. R. Geoscience, 2016, 348: 499-509, 11 pages.

Lineman et al., "Well to Well Log Correlation Using Knowledge-Based Systems and Dynamic Depth Warping," SPWLA Twenty-Eighth Annual Logging Symposium, Jun. 29-Jul. 2, 1987, 25 pages.

Nakanishi and Nakagawa, "Speaker-Independent Word Recognition by Less Cost and Stochastic Dynamic Time Warping Method," ISCA Archive, European Conference on Speech Technology, Sep. 1987, 4 pages.

Pels et al., "Automated biostratigraphic correlation of palynological records on the basis of shapes of pollen curves and evaluation of next-best solutions," Paleogeography, Paleoclimatology, Paleoecology, 1996, 124: 17-37, 21 pages.

Pollack et al., "Automatic Well Log Correlation," AAPG Annual Convention and Exhibition, Apr. 3, 2017, 1 page, Abstract Only.

Rudman and Lankston, "Stratigraphic Correlation of Well Logs by Computer Techniques," The American Association of Petroleum Geologists, Mar. 1973, 53:3 (557-588), 12 pages.

Sakoe and Chiba, "Dynamic Programming Algorithm Optimization for Spoken Word Recognition," IEEE Transactions on Acoustics, Speech and Signal Processing, ASSP-26:1, Feb. 1978, 7 pages.

Salvador and Chan, "FastDTW: Toward Accurate Dynamic Time Warping in Linear Time and Space," presented at the KDD Workshop on Mining Temporal and Sequential Data, Intelligent Data Analysis, Jan. 2004, 11:5 (70-80), 11 pages.

Sayhi, "peakdet: Peak detection using MATLAB," Jul. 2012, 4 pages.

Scribd.com [online], "Milling Practices and Procedures," retrieved from URL <https://www.scribd.com/document/358420338/Milling-Rev-2-Secured>, 80 pages.

Silva and Koegh, "Prefix and Suffix Invariant Dynamic Time Warping," IEEE Computer Society, presented at the IEEE 16th International Conference on Data Mining, 2016, 6 pages.

Smith and Waterman, "New Stratigraphic Correlation Techniques," Journal of Geology, 1980, 88: 451-457, 8 pages.

Startzman and Kuo, "A Rule-Based System for Well Log Correlation," SPE Formative Evaluation, Society of Petroleum Engineers (SPE), Sep. 1987, 9 pages.

TAM International Inflatable and Swellable Packers, "TAM Scab Liner brochure," Tam International, available on or before Nov. 15, 2016, 4 pages.

Tomasi et al., "Correlation optimized warping and dynamic time warping as preprocessing methods for chromatographic data," Journal of Chemometrics, 2004, 18: 231-241, 11 pages.

Uchida et al., "Non-Markovian Dynamic Time Warping," presented at the 21st International Conference on Pattern Recognition (ICPR), Nov. 11-15, 2012, 4 pages.

Waterman and Raymond, "The Match Game: New Stratigraphic Correlation Algorithms," Mathematical Geology, 1987, 19:2, 19 pages.

Weatherford, "Micro-Seal Isolation System-Bow (MSIS-B)," Weatherford Swellable Well Construction Products, Brochure, 2009-2011, 2 pages.

Zoraster et al., "Curve Alignment for Well-to-Well Log Correlation," SPE 90471, Society of Petroleum Engineers (SPE), presented at the SPE Annual Technical Conference and Exhibition, Sep. 26-29, 2004, 6 pages.

(56) References Cited

OTHER PUBLICATIONS

PCT International Search Report and Written Opinion in International Appln. No. PCT/US2022/011583, dated Apr. 19, 2022, 14 pages.

* cited by examiner

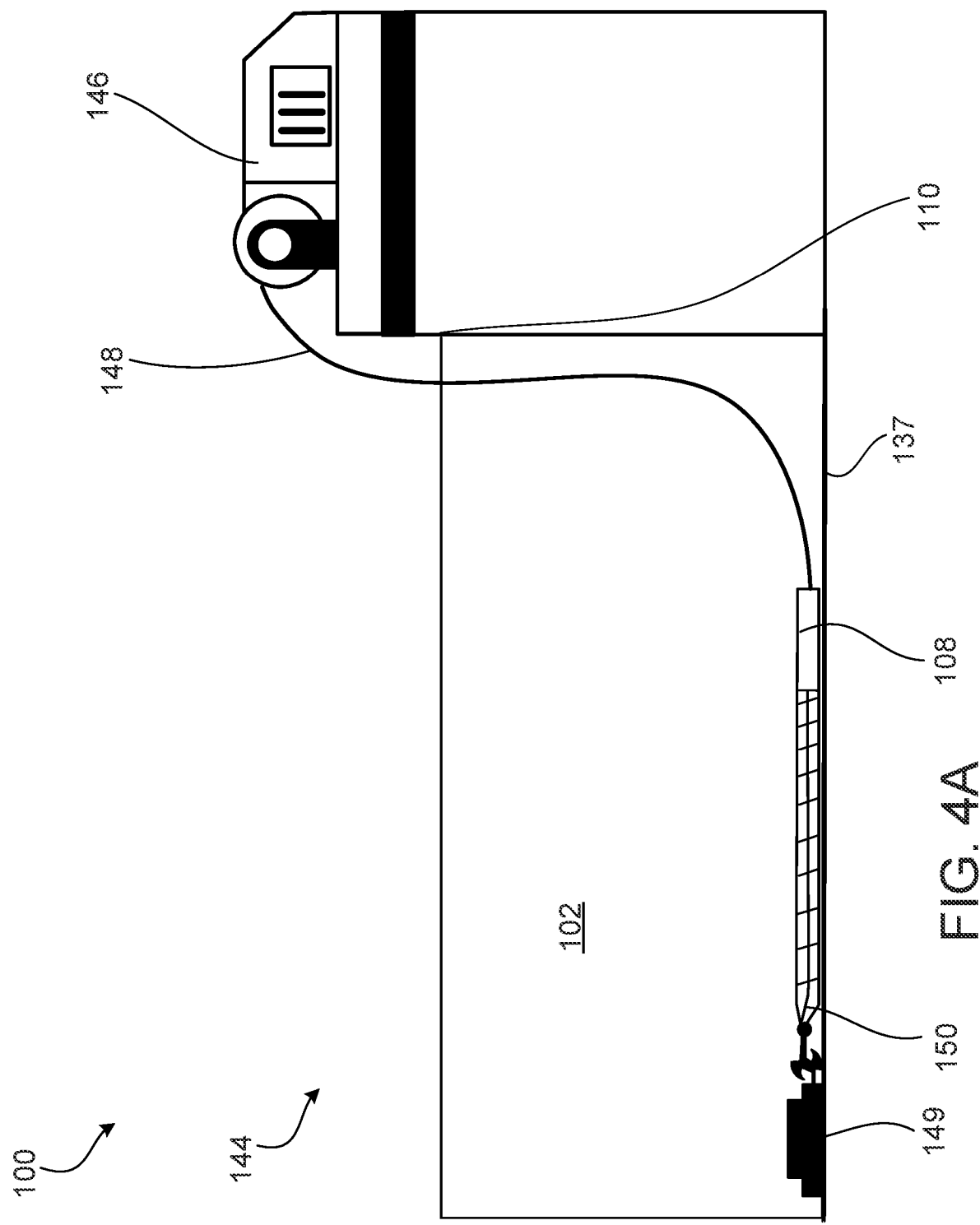

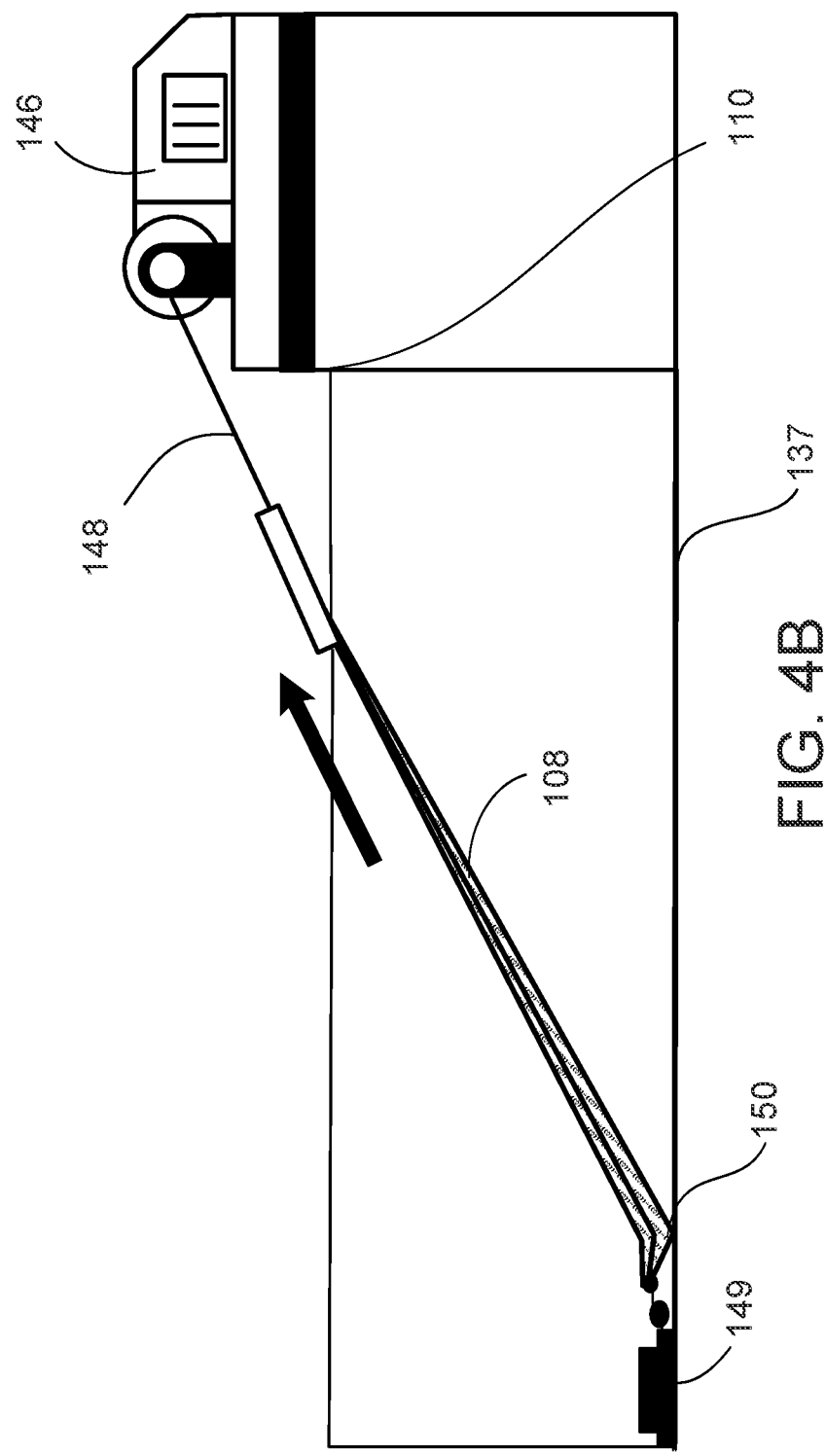

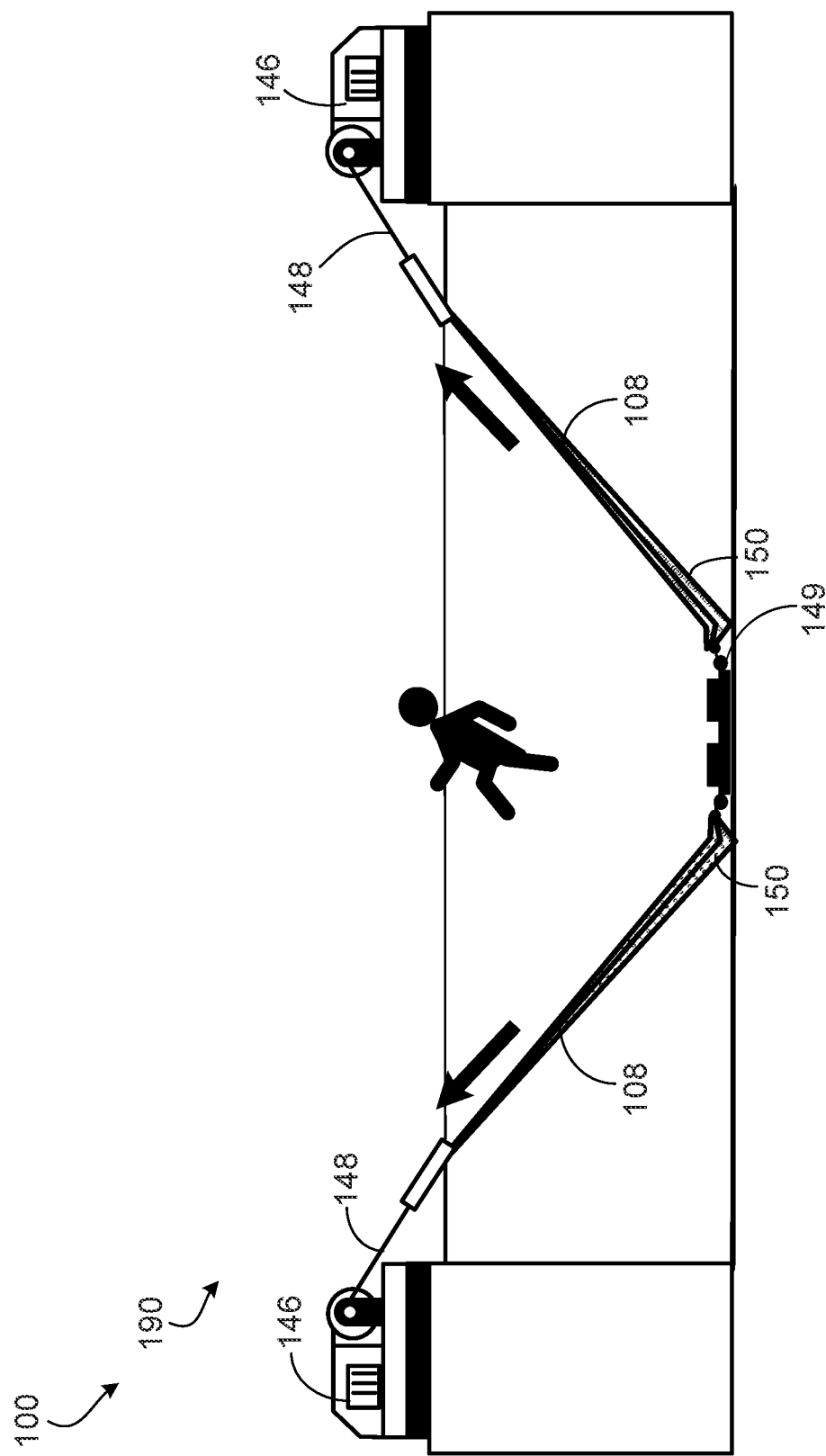

WELLBORE MUD PIT SAFETY SYSTEM

TECHNICAL FIELD

The present disclosure relates to a safety system for drowning prevention, for example, in a wellbore drilling mud pit.

BACKGROUND

A wellbore is formed by drilling a subterranean zone (for example, a formation, a portion of a formation or multiple formations) using a drilling assembly that includes a drill bit. The drill bit is attached to an end of a drill string. The drill string is rotated, thereby rotating the drill bit. The drill bit is driven through the subterranean zone to form the wellbore. Drilling fluid (also called drilling mud) is flowed from the surface of the formation through the drill string. The drilling fluid flows out of ports in the drill bit and into an annulus formed between an outer surface of the drill string and the inner wall of the wellbore. The drilling mud flows in an uphole direction towards the surface. When doing so, the drilling fluid carries with it, debris that results from the drilling operation. At the surface, the debris is filtered from the drilling fluid (for example, using shale shakers), and the drilling fluid is collected in a mud pit. Pumps connected to the mud pump then pump the drilling fluid back through the drill string, and the flow process is repeated. The mud pits in which the drilling mud is collected can have dimensions large enough for a person or object to accidentally fall into the pit.

SUMMARY

This disclosure describes technologies relating to wellbore mud pit safety systems.

In certain aspects, a fluid pit safety system to prevent drowning incidents in a fluid pit filled with a fluid is disclosed. The fluid pit safety system includes a plurality of sensors spatially disposed adjacent the fluid pit, a perimeter detection sub-system defining a perimeter arranged around an edge of the fluid pit, and a rescue device arranged in the fluid pit. The plurality of sensors are configured to detect a change in fluid height in the fluid pt. The perimeter detection sub-system is configured to detect a disruption in the perimeter. The rescue device is configured to move towards a surface of the fluid in the fluid pit in response to the plurality of sensors detecting the change in the fluid height in the fluid pit and the perimeter detection sub-system detecting the disruption in the perimeter.

In some cases, the fluid pit safety system also has a computer system operatively coupled to the plurality of sensors, the perimeter detection sub-system, and the rescue device, The computer system includes one or more processors; and a computer-readable medium storing instructions executable by the one or more processors to perform operations including receiving a first signal from the plurality of sensors in response to the change in the fluid height in the fluid pit, receiving a second signal from the perimeter detection sub-system in response to detecting the disruption in the perimeter, and actuating a rescue sub-system connected to the rescue device to move the rescue device towards the surface of the fluid in the fluid pit.

In some embodiments, the rescue sub-system has a first motor connected to a first end of the rescue device. A second end of the rescue device can be attached to an anchor arranged on a floor of the fluid pit. In some systems, the first motor is configured to rotate in a first direction such that the first end of the rescue device moves axially within the fluid pit. In some the rescue sub-system comprises a second motor connected to a second end of the rescue device. The second motor can be configured to rotate in a first direction such that the second end of the rescue device moves axially within the fluid pit.

In some embodiments, the rescue device is a net.

In some fluid pit safety systems, a rescue sub-system comprises a plurality of rescue devices.

The perimeter detection sub-system can include at least one light emitter configured to emit a light beam; a plurality of field deflectors configured to direct the light beam, and at least one light beam detector configured to detect the light beam. The plurality of field deflectors may be arranged around the edge of the fluid pit. In some embodiments, the light beam detector is configured to detect the disruption of the perimeter in response to detecting an absence of the light beam emitted by the light emitter.

In some fluid pit safety systems, the plurality of sensors includes a fluid height sensor arranged above the surface of the fluid in the fluid pit. The fluid height sensor can be configured to detect an increase or decrease in the fluid height. The fluid height sensor can be an ultrasonic sensor.

In some embodiments, plurality of sensors includes gas detectors arranged above the surface of the fluid pit. 16. The gas detectors can be configured to sense concentrations of at least one of hydrogen sulfide and hydrocarbon gas.

Some fluid pit safety systems also include a camera configured to capture images of the fluid pit.

In some instances, the fluid pit safety system includes an alarm sub-system configured to notify an operator. The alarm sub-system is operatively coupled to a processor. The alarm sub-system can include a first alarm and a second alarm.

In certain aspects, a method for preventing a safety incident; the method includes detecting a state change of a perimeter detection arrangement arranged around an edge of a pit of fluid, detecting a change in fluid height using a plurality of sensors arranged above the fluid pit, and deploying a rescue device in the fluid pit in response to detecting the state change and in response to detecting the change in the fluid height.

Some methods include deploying a rescue device in the fluid pit comprises detecting a location of an object in the fluid. The location can be detected using a camera.

In some embodiments, the method also includes deploying the rescue device in the fluid pit further comprises raising a first end of a rescue device such that the first end is adjacent an edge of the fluid pit. In some methods, a motor raises the first end of the rescue device. The can be rescue device is a net.

In some methods, deploying the rescue device in the fluid pit further includes raising a first end of a plurality of rescue devices such that the first ends are adjacent an edge of the fluid pit.

In some embodiments, detecting a state change of a perimeter detection arrangement arranged around the edge of the fluid pit includes generating a light emitter perimeter around an edge of the fluid pit and detecting a break in the light emitter perimeter.

In some methods, detecting a state change of a perimeter detection arrangement arranged around the edge of the fluid pit includes actuating a visual alarm.

Some methods also include actuating an alarm to notify an operator of the safety incident. The alarm can be a visual alarm, an auditory alarm, or both a visual alarm and an auditory alarm.

In certain aspects, a fluid pit safety system to prevent drowning incidents in a fluid pit filled with a fluid, the system includes a plurality of sensors spatially disposed adjacent the fluid pit, a perimeter detection sub-system defining a perimeter arranged around an edge of the fluid pit, and a rescue device arranged in the fluid pit, The plurality of sensors include an ultrasonic sensor configured to detect a change in fluid height in the fluid pit. The perimeter detection sub-system is configured to detect an object crossing the perimeter. The rescue device includes a net.

A first end of the net is configured to move towards a surface of the fluid in the fluid pit in response to the plurality of sensors detecting the change in the fluid height in the fluid pit and the perimeter detection sub-system detecting the disruption in the perimeter.

The fluid pit safety system may reduce the frequency and severity of safety incidents (e.g., drowning incidents, hazardous gas incidents) in or adjacent a volume of fluid. The fluid pit safety system may also reduce the number of fatalities and/or injury that result from the safety incidents. The system may further expedite rescue by actuating a rescue device closest to the victim and alerting personnel to the safety incident.

The details of one or more embodiments are set forth in the accompanying drawings and the description below. Other features, objects, and advantages will be apparent from the description and drawings, and from the claims.

DESCRIPTION OF DRAWINGS

FIGS. 4A and 4B are schematic views of a rescue device of the safety system in the undeployed and deployed positions.

FIG. 6 is a safety system that include multiple rescue devices.

Like reference symbols in the various drawings indicate like elements.

DETAILED DESCRIPTION OF THE FIGURES

A safety system to detect a drowning incident and deploy a rescue device is disclosed. The safety system is arranged adjacent a pit of a hydrocarbon production facility, for example, a mud pit of a wellbore drilling system. The safety system includes a rescue sub-system, a perimeter detection sub system, and multiple sensors. Each of the rescue sub-system, perimeter detection sub system, and multiple sensors are operatively connected to a processor. The perimeter detection sub-system generates a crossable perimeter, for example, a light beam perimeter, around a pit. The multiple sensors monitors a change in the water height, and the rescue sub-system deploys the rescue device. When triggered, the perimeter detection sub-system signals to the processor that the perimeter has been broken, indicating that a person (or object) is near or approaching the fluid pit. The processor then prompts the multiple sensors to analyze the water height of the fluid pit. If the water height has changed, it can be inferred that the person or object near the fluid pit, fell into the fluid pit producing waves and that a drowning incident is occurring. The waves are measured as changes in water height, sensed by the multiple sensors. The processor, having determined that the perimeter has been broken and that the height of the waves have changed, causes the rescue sub-system to deploy a rescue device to aid the drowning victim and prompts an alarm system to alert near-by personnel of the drowning event.

The fluid pit safety system notifies rig personnel to a potential drowning incident in mud or fluid pits and deploys a rescue device to aid the drowning victim. The fluid pit safety system can increase safety and decrease fatal or traumatic accidents in an oil production environment. The fluid pit safety system may prevent the drowning victim from attempting to escape the pit, unassisted, using the edges of the pit. The edges of the pit are slippery and can increase the risk of injury to the drowning victim. The fluid pit safety system provides a safer path for rescue while also alerting any surrounding personnel. Further, the fluid pit safety system may operate autonomously, without human interference and may operate during a power failure.

In addition, the safety system also monitors pit levels to detect overflow using multiple gas sensors. The fluid pit safety system can detect dangerous gas leaks around or in the fluid pit. The safety system may be used in wellbore drilling system environments or may be applied to other environments with similarly sized bodies of fluid, for example, a recreational pool, reservoir, or pond to improve the safety of these environments.

Figure 1:
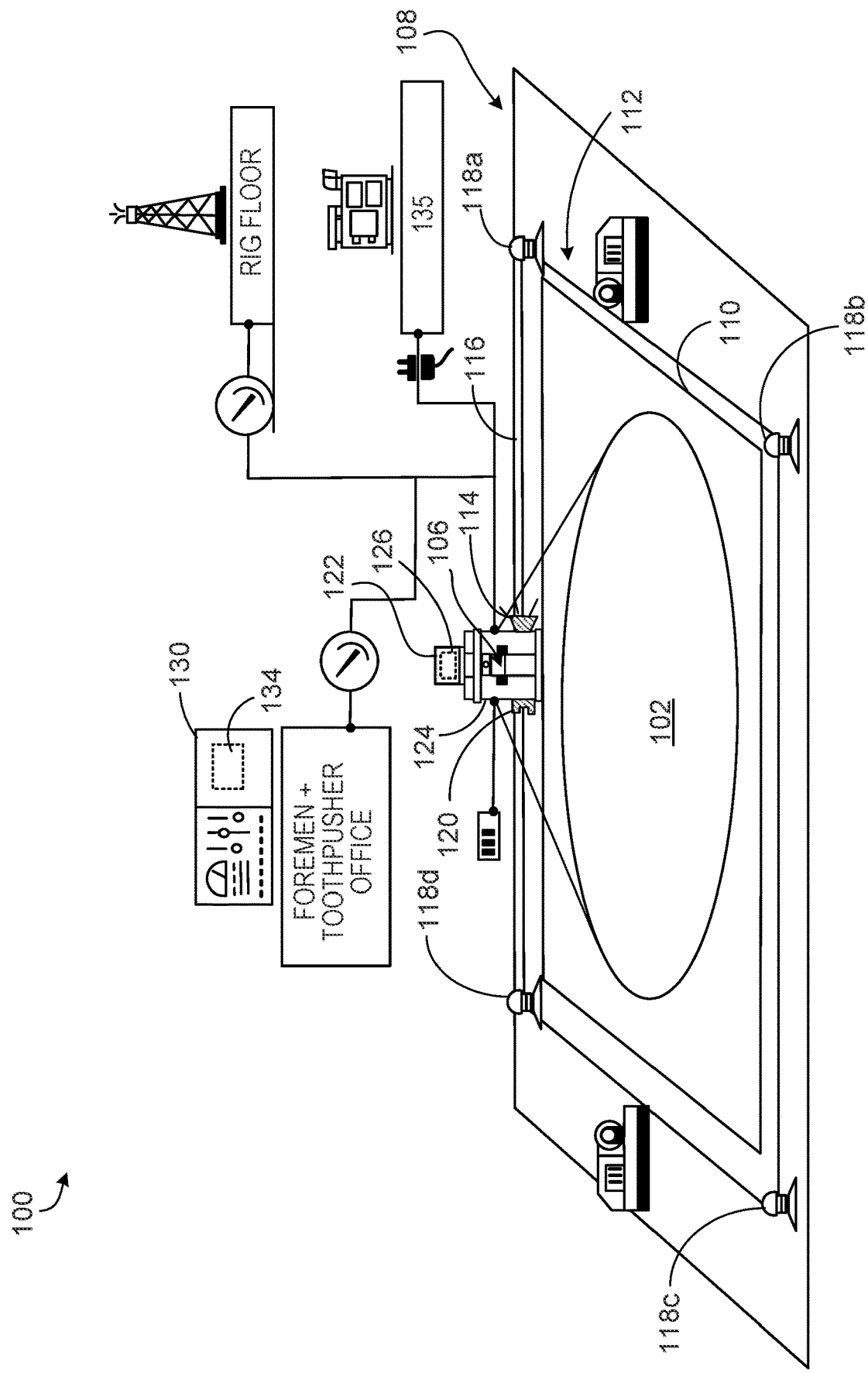
FIG. 1 is a schematic view of a mud pit safety system.

FIG. 1 shows a fluid pit safety system 100 that may prevent safety incidents from occurring in a pit (fluid pit) 102 filled with fluid, arranged in a wellbore drilling system. A pit, in general, is an open hole or space dug in the ground that can hold a volume of fluid and whose dimensions (length, width, diameter, depth) is large enough to hold a large volume of fluid. The type of fluid that the pit contains can cause drowning, for example, because the fluid is viscous or toxic. The mud pit is part of an oil rig system for drilling a wellbore. The fluid pit may hold drilling mud, produced water, or any other type of fluid used during wellbore drilling. Alternatively or in addition, the pit can be used to collect or store fluids during hydrocarbon production after the wellbore has been formed or for other well operations.

In the fluid pit safety system 100, the fluid pit 102 is a mud pit of the wellbore drilling system. The fluid pit safety system 100 includes multiple sensors 106, spatially disposed adjacent the fluid pit 102, a perimeter detection sub-system 104 adjacent an edge 110 the fluid pit, and a rescue device 108.

The perimeter detection sub-system 104 generates a perimeter 112 and is arranged around the edge of the fluid pit 102. The perimeter may be arranged at or at a distance from an edge 110 of the fluid pit 102. The perimeter 112 is a light beam perimeter. As described below, the perimeter detection sub-system 104 is configured to detect a disruption in the perimeter 112, for example an object crossing the perimeter 112.

The perimeter detection sub-system 104 includes a light emitter 114, for example a light emitter, that is operable to emit a light beam 116. The perimeter detection sub-system 104 has multiple field deflectors 118*a-d*. The field sensor deflectors can be mirrors or light guides that reflect or guide the light beam. The field sensor deflectors are arranged periodically around the edge 110 of the perimeter 112 to direct the light beam 116 around the edge 110 of the perimeter 112.

The path of the light beam 116, which defines the perimeter 112 extends around the edge 110 of the fluid pit 102 and is received by a light beam detector 120. The field deflectors 118a-d are positioned 3 inches (in) to 6.5 feet (ft) from the edge 110 of the fluid pit 102. Some field deflectors are be positioned adjacent or within 1 inch feet to about 12 feet of the edge 110. The light emitter 114 and the light beam detector 120 are arranged adjacent each other, but oriented in opposite directions so that the perimeter 112 extends around a majority of the fluid pit. In some fluid pit safety systems, the light emitter and light beam detector are mechanically coupled to form a unit. The coupling of the light emitter and light beam detector may reduce the complexity of repairs to the light emitter or light beam detector. In some fluid pit safety systems, the perimeter extends around a portion of the fluid pit, for example a single side of the fluid pit. The light beam detector 120 is configured to detect a disruption of the perimeter 112 in response to detecting an absence of the light beam 116 emitted by the light emitter 114.

Some perimeters are other wavelength light beams or light barriers, for example using infra-red light or ultraviolet light. Some perimeters are light curtains. Some perimeters are image based perimeters, for example, a field of vision of a camera.

The fluid pit safety system 100 includes a computer system 122 arranged in a housing 124 adjacent the edge 110 of the fluid pit 102. Some computer systems are remotely located or are located elsewhere in the wellbore drilling system. The computer system 122 includes processor 126 and a computer-readable medium storing instructions executable by the processors 126 to perform operations. The processor 126 is operatively coupled to the multiple sensors 106, the perimeter detection sub-system 104 and the rescue device 108. The processor 126 receives a signals from the perimeter detection sub-system 104 and the multiple sensors 106 and, in response, actuates the deployment of the rescue device 108.

The fluid pit safety system 100 also includes a camera 128 arranged adjacent the fluid pit 102 in the housing 124. Some cameras are arranged above the mud pit. Some cameras are arrange outside the housing. The camera 128 is a wide view camera that captures images of the fluid pit 102. The processor 126 is operatively coupled to the camera 128 such that the processor 126 analyzes images captured by the camera 128. The camera 128 is also operatively connected to a supervisor computer system (supervisor display) 130 such that the camera 128 transmits images or videos to the supervisor computer system (display) 130 when a drowning incident is detected. In some fluid pit safety systems, the camera transmits images or videos to the display when a perimeter disruption is detected by the perimeter detection sub-system. In some fluid pit safety systems, the camera transmits images or videos to the display when, alternatively or additionally to the perimeter disruption, a fluid height change outside a predetermined range is detected in the fluid pit by the multiple sensors.

An alarm sub-system includes a first alarm 132, for example, an LED, mounted on the housing 124 and a second alarm 134, for example a visual notification in the display device or an auditory alarm emitted from a speaker of the housing 124. The alarm sub-system is operatively coupled to the processor 126, such that the processor 126 prompts the first and second alarms 132, 134. The processor 126 prompts the first alarm 132 based on the signals received from the perimeter detection sub-system 104. Alternatively or in addition, the processor 126 prompts the second alarm 134 based on signals received from the multiple sensors 106 or based on both the signals received from the multiple sensors 106 and the signals received from the perimeter detection sub-system 104. Some fluid pit safety systems have a variety of auditory and visual alarms that notify workers, supervisors, and persons to the drowning incident.

A power supply 135 is electrically connected to the perimeter detection sub-system 104, the multiple sensors 106, a rescue sub-system (FIG. 4A), the computer system 122, the camera 128, and the alarm sub-system 13. The power supply 135 can include a solar powered back up supply and/or battery that continues to provide power to the fluid pit safety system 100 in the event of a power failure.

Figure 2A:
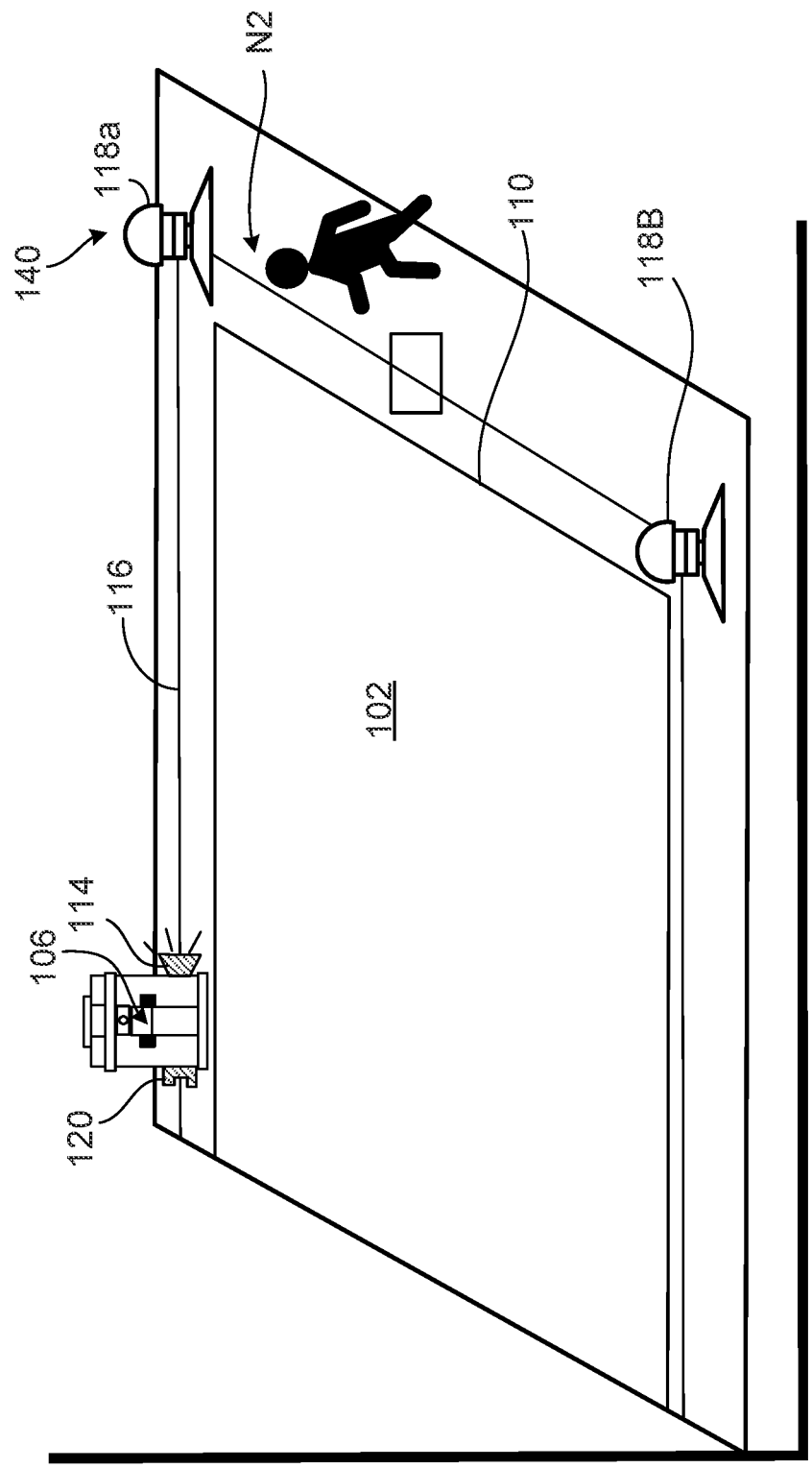
FIGS. 2A and 2B are schematic views of the safety system of FIG. 1 in operation.
Figure 2B:
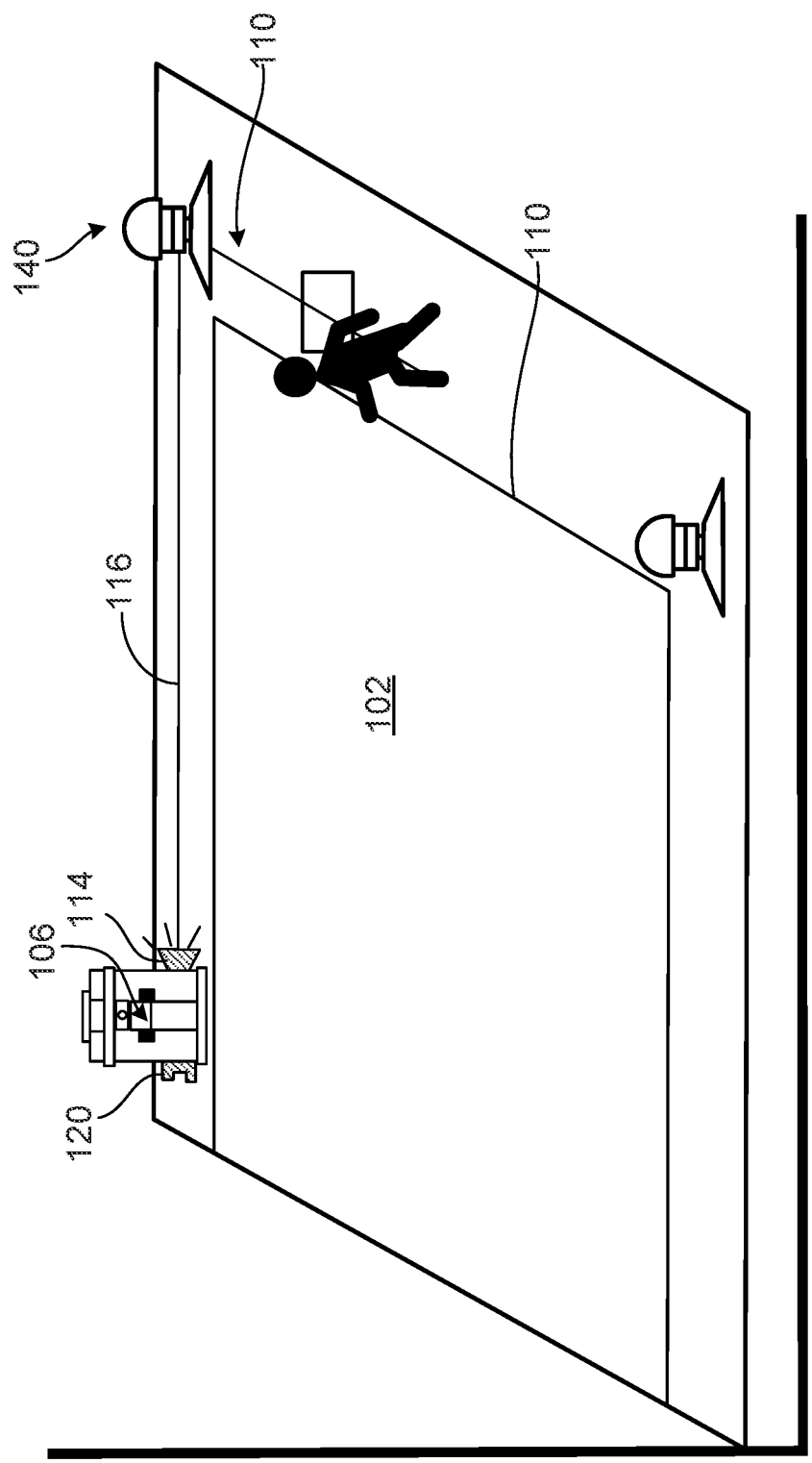

FIGS. 2A and 2B are schematic views of the fluid pit safety system 100 of FIG. 1 in operation. FIG. 2A shows the perimeter detection sub-system 104 in a first state and FIG. 2B shows the perimeter detection sub-system 104 in a second (triggered) state. In the first state, the light beam 116 extends from the light emitter 114 to the light beam detector 120 via the field deflectors 118a-118d. The light beam detector 120 receives the light beam 116 and the light circuit is completed without interruption. Consequently, in some implementations, no signals are transmitted to the processor. Alternatively or in addition, in some implementations, the perimeter detection sub-system transmits a "perimeter maintained" signal to the processor that represents the absence of a perimeter disruption.

FIG. 2B shows a perimeter disruption caused by a person crossing the perimeter 112. The person blocks the light beam 116 and the light beam detector 120 does not receive the light beam 116 for a period of time (for example, at least 1 millisecond or even less). In response to the light beam detector 120 not receiving the light beam 116 for the period of time, the perimeter detection sub-system 104 sends a perimeter disruption (first) signal to the processor 126. In response to the perimeter disruption signal, the processor 126 transmits a signal to the first alarm 132 on the housing 124 causing the first alarm 132 to emit a light.

In some fluid pit safety systems, the first alarm is not prompted by disruption of the perimeter alone. That is, the perimeter disruption signal alone does not indicate that a drowning incident is occurring, as the person could block the beam 116, break the perimeter 112, and move away from the fluid pit after viewing the first alarm 132 or recognizing his/her surroundings. Instead, receiving the perimeter disruption signal indicates to the processor 126 that the water height $h_{fluid}$ should be analyzed. If the water height $h_{fluid}$ is changing, particularly above a specified threshold, one can infer that the person who disrupted the perimeter 112 fell into the fluid pit 102 and generated waves in the fluid pit 102.

Figure 3A:
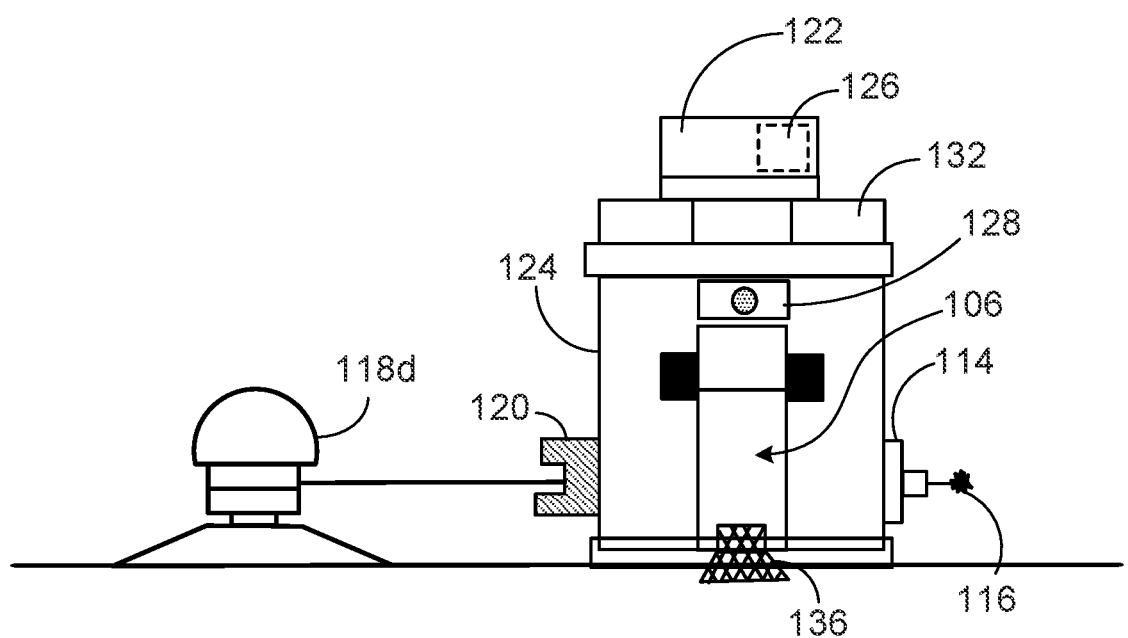
FIGS. 3A and 3B are schematic views of a perimeter detection device of the safety system in a first state and a second state.
Figure 3B:
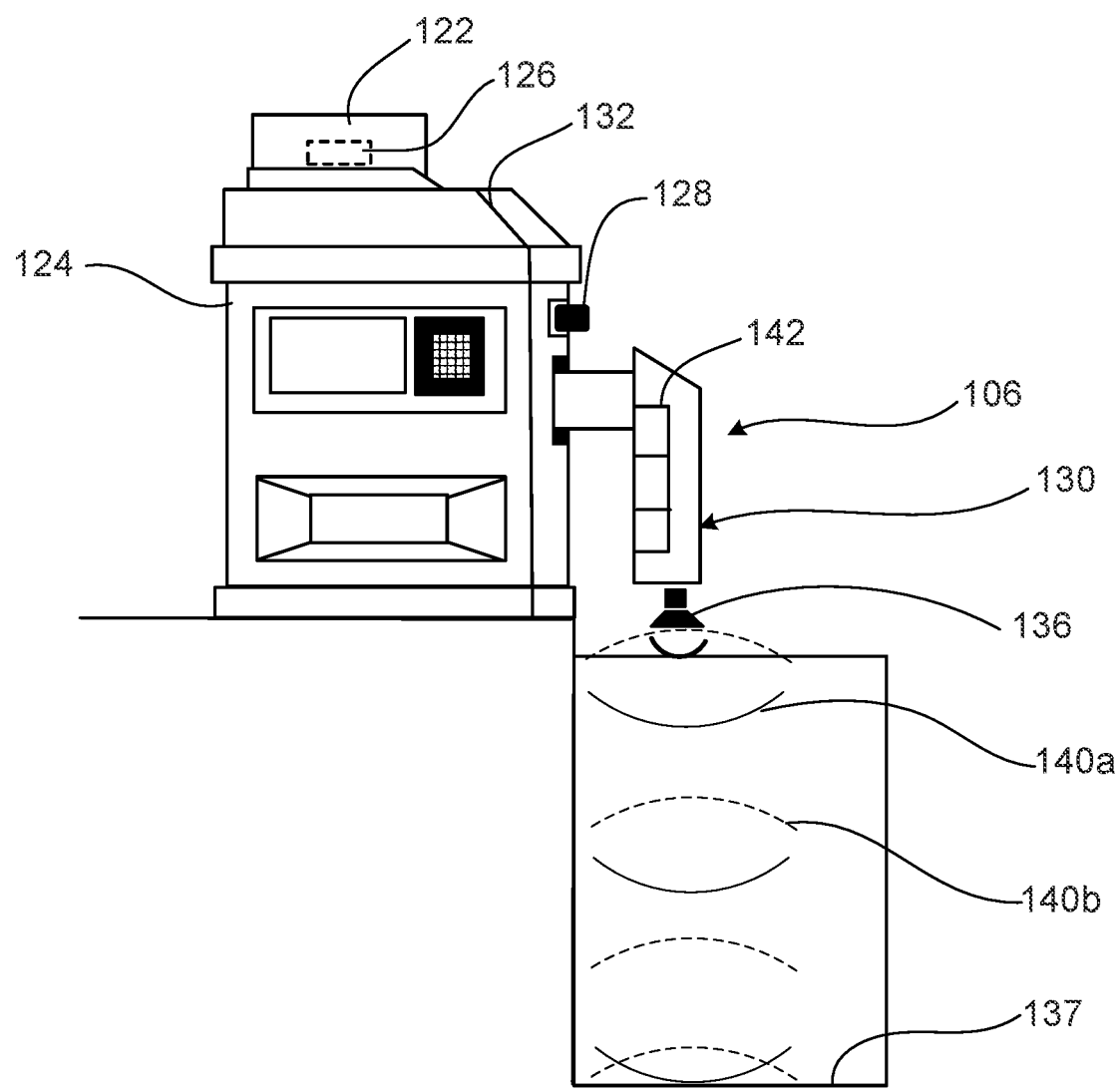

FIGS. 3A and 3B are schematic views of the perimeter detection sub-system 104 of the fluid pit safety system 100 in a first state and a second state. The multiple sensors 106 are mounted on the housing 124. The multiple sensors 106 of the fluid pit safety system 100 are configured to detect the fluid height $h_{fluid}$, a change in fluid height $\Delta h_{fluid}$, and dangerous gas concentrations. The multiple sensors 106 include fluid height sensor 136 for detecting a fluid height $h_{fluid}$ in the fluid pit 102. In the fluid pit safety system 100, the fluid height sensor 136 is an ultrasonic sensor. Some fluid height sensors are float devices, described in further detail with reference to FIGS. 7A-7C. The fluid height sensor 136 is arranged on an arm 138 of the housing 124. The arm 138 extends so that the fluid height sensor 136 is arranged above the surface of the fluid in the fluid pit 102. The fluid height sensor 136 is oriented so that the fluid height sensor 136 is perpendicular to the surface of the fluid in the fluid pit 102. When taking a fluid height measurement, the fluid height sensor 136 emits an ultrasonic waves 140a and receives reflected ultrasonic waves 140b. The ultrasonic waves 140a reflect off various surfaces (target surfaces), for example, the surface of the fluid and/or a floor 137 of the fluid pit 102. The travel time of the wave is proportional to the distance between the fluid surface and the fluid height sensor 136. The travel time of the wave can indicate that the fluid surface height $h_{fluid}$ has changed relative to the fluid height sensor 136 when compared to a previously fluid height measurement. For example, a shorter travel time compared to a previous fluid height measurement indicates that the fluid level has risen relative to the fluid height sensor, whereas longer travel time compared to a previous fluid height measurement indicates that the fluid level has receded relative to the fluid height sensor. In this configuration, the fluid height sensor 136 is configured to detect an increase or decrease in the fluid height $h_{fluid}$.

The fluid height sensor 136 emits a series of ultrasonic waves 140a over a period of time (e.g., 1 second, 3 seconds, 5 seconds, 10 seconds, 15 second, 20 seconds, 30 seconds) when prompted by the processor 126. The data generated by the fluid height sensor 136 is evaluated and/or analyzed to determine if the sensed fluid height haw or change in fluid height $\Delta h_{fluid}$ is outside a predetermined threshold (e.g., a fluid height that is greater than 3 ft, 4 ft, 5 ft, 6 ft, 7 ft, 8 ft, 9 ft, or 10 ft) or range (e.g., a change in fluid height that is more than 1 inch, 2 inches, 3 inches, 4 inches, 5 inches, or 6 inches). The predetermined threshold and/or range accounts for changes in fluid height due to various environmental stimuli, for example vibrations due to adjacent drilling equipment or wind. In some instances, the fluid height sensor continuously transmits ultrasonic waves and continually analyzes the reflected ultrasonic waves to determine the fluid height or change in fluid height. In some instances, the fluid height sensor periodically transmits ultrasonic waves and periodically analyzes the reflected ultrasonic waves to determine the fluid height or change in fluid height. The fluid height sensor may transmit ultrasonic waves every minute, every 5 minutes, every 15 minutes, every 30 minutes, every 45 minutes, or every hour.

Some fluid pit safety systems can compare the travel time to known travel times that correspond to known distances, thereby determining the exact distance of the fluid sensor from the surface. In such a system, the fluid height sensor also analyzes the waves reflected from the floor of the mud pit. The difference between the distance from the fluid height sensor to the fluid surface and the distance from the fluid height sensor to the bottom of the mud pit is the calculated fluid height. In some fluid pit safety systems, the depth of the fluid pit is known and the difference between the distance from the fluid height sensor to the fluid surface and the known pit depth is the fluid height.

The multiple sensors can include gas detectors 142 also mounted on the arm 138 of the housing 124 so that the gas detectors 142 are directly above the surface of the fluid pit 102. The gas detectors 142 are configured to sense concentrations hydrogen sulfide and hydrocarbon gas released from the fluid pit 102. The gas detectors 142 have a predetermined gas concentration threshold above which is considered a high gas concentration. When the gas detectors 142 measure a gas concentration (or multiple gas concentrations) below the threshold, the multiple sensors 106 do not transmit a signal to the processor 126. The detected concentration below the threshold may be categorized as a low or regular concentration. The gas detectors 142 send a third signal, e.g., a high gas concentration signal, to the processor 126 if the gas concentrations exceed the threshold, for example about 8 parts per million (ppm) to about 12 ppm (e.g., 10 ppm) for hydrogen sulfide and about 0 ppm to about 15 ppm (e.g., above 0 ppm) for hydrocarbon gas. In some systems, the threshold for each gas is the lower explosion level of the gas. In response to the high gas concentration signal, the processor 126 prompts the first alarm 132 to emit a light. Some processors 126, upon receiving a high gas concentration signal, prompt both the first alarm 132 and the second alarm 134. In some instances, the gas detector can have multiple threshold associated with specific gases, for example, a threshold concentration for hydrogen sulfide and a different threshold concentration for hydrocarbon gas.

The multiple sensors 106 are prompted by the processor 126 to take a water height measurement using the fluid height sensor 136, in response to the processor 126 receiving a perimeter disruption signal. In some fluid pit safety systems, the water height sensor continually measures the water height. In such a system, the processor receives a packet of water height data from the multiple sensors. If an object has fallen into the fluid pit 102, the water height changes. The fluid height sensor 136 detects changes in the fluid height $\Delta h_{fluid}$ and compares the changes in the fluid height $\Delta h_{fluid}$ to a predetermined range. If the changes in the fluid height $\Delta h_{fluid}$ are outside the predetermined range, the multiple sensors 106 transmits a water height change (second) signal. In some systems, the processor monitors the multiple sensors to detect changes in the fluid height. The processor 126 receives a second (water height change) signal from the multiple sensors 106. In response to receiving a perimeter disruption signal and a water height change signal, the processor 126 actuates a rescue sub-system (FIGS. 4A and 4B) connected to the rescue device 108. In the fluid pit safety system 100, the rescue device 108 moves towards the surface of the fluid in the fluid pit 102.

FIGS. 4A and 4B are schematic views of a rescue device 108 of the fluid pit safety system 100 in the undeployed and deployed positions. FIG. 4A shows the rescue device 108 of a rescue sub-system 144 arranged in the fluid pit 102 in an undeployed position. During a drowning incident, the rescue device 108 is actuated by the rescue sub-system 144. The rescue sub-system 144 includes a first motor 146 connected to a first end 148 of the rescue device 108. An anchor 149 of the rescue sub-system is arranged at a center point on the floor 137 of the fluid pit 102. A second end 150 of the rescue device 108 is releasably attached to the anchor 149, for example, by complimentary hooks. The rescue device 108 is a net. Some rescue devices are ropes or a sheet of flexible fabric. Some rescue devices are rigid beams that are connect to the motor 146 by a rope. The rescue device is reusable and maintains a position in the fluid pit 102 between uses. The rescue device is detachable from the anchor 149 so that a new rescue device can be installed in the event of a tear or deterioration of the rescue device 108.

The rescue device 108 is configured to move towards the surface of the fluid in the fluid pit 102, in response to the multiple sensors 106 detecting the change in the fluid height $h_{fluid}$ in the fluid pit 102 and the perimeter detection sub-system 104 detecting the disruption in the perimeter 112. The processor 126 prompts the rescue sub-system 144 to move the rescue device 108 from an undeployed position to a deployed position. FIG. 4B shows the rescue device 108 in the fluid pit 102 in the deployed position. The motor 146 rotates in a first direction, moving the first end 148 of the rescue device 108 axially within the fluid pit 102, towards the surface of the fluid. In the deployed position, the rescue device 108 is taut and capable of holding the weight of the drowning victim. Rotating the motor 146 in a second direction, opposite the first direction, releases tension in the taut rescue device 108. The first end 148 of the rescue device 108 sinks into the fluid pit 102 as the motor 146 rotates in the second direction, moving the rescue device 108 from the deployed position to the undeployed position.

Figure 5:
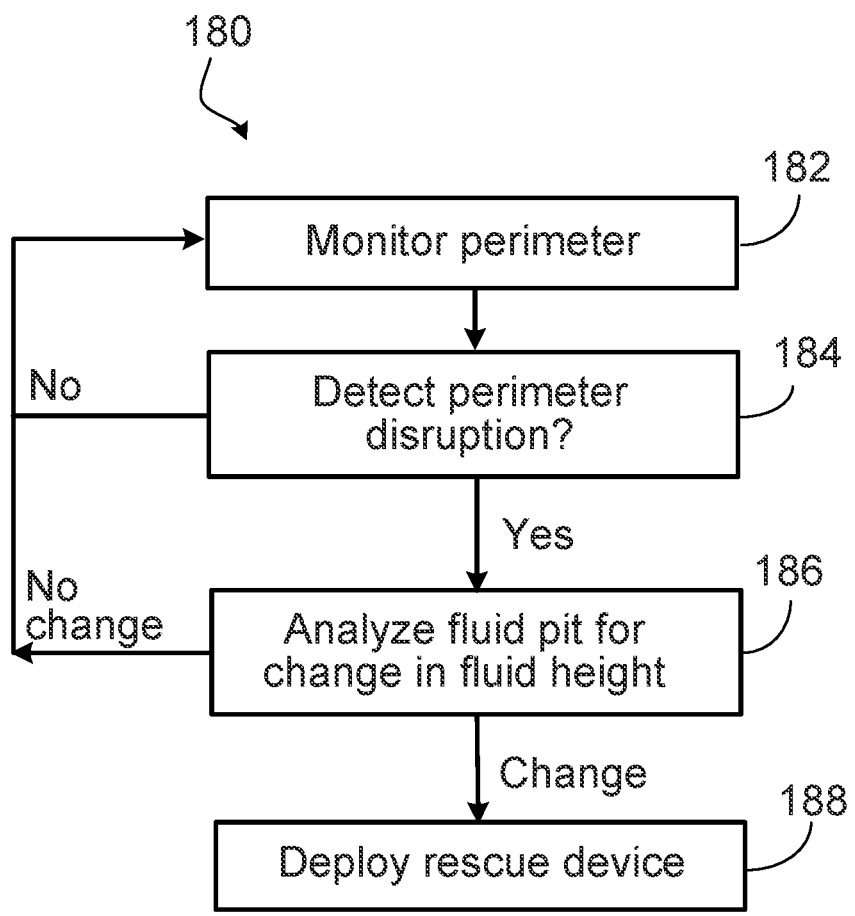
FIG. 5 is a flow diagram of an example of a method for using a safety system.

FIG. 5 is a flow diagram of an example of a method 180 for using a safety system. The method 180 is described with reference to the fluid pit safety system 100, however, the method 180 can be used with any applicable safety system. The method 180 may prevent a safety incident (e.g., a drowning incident and/or a toxic gas incident).

Initially, the perimeter 112 of the perimeter detection sub-system 104 extends from the light emitter 114 to the light beam detector 120 via the field deflectors 118a-d. The perimeter 112 extends around the edge 110 of the fluid pit 102. The light beam detector 120 monitors the perimeter 112 (step 182). The multiple sensors 106 monitors the concentrations of gases from the fluid pit 102.

A person (or other animal or object) moving about the wellbore drilling system breaks the perimeter 112 and disrupts the emission of the light beam 116 from the light emitter 114 to the light beam detector 120. The light beam detector 120 detects an absence of light and transmits a perimeter disruption (first) signal to the processor 126 (step 182). The processor 126 prompts the fluid height sensor 136 to detect a change in fluid height over time, for example between about 3 seconds to about 5 seconds. Some fluid height sensors detect over a time period of less than 3 seconds or more than 5 seconds, e.g., 0.5 seconds, 1 second, 2 seconds, 6 seconds, 10 seconds, or 15 seconds. The processor can also prompt the first alarm to emit a visual notification.

The fluid height sensor 136, arranged above the surface of the fluid, monitors the fluid height over the period of time. (step 186). If the fluid height does not change, or changes within a predetermined range, the fluid pit safety system 100 returns to the initial state. In such as case, the person or animal may have retreated after breaking the perimeter 112 or an object leaf have temporarily disrupted the light beam 116, for example a leaf. If the fluid height sensor 136 detects a change in fluid height $\Delta h_{fluid}$, the fluid height sensor 136 transmits a fluid height change (second) signal to the processor 126.

In response to both the perimeter disruption signal and the fluid height change signal, the processor actuates the rescue sub-system 144 to deploy the rescue device 108 (step 188). The processor 126 also prompts the first and the second alarm 132, 134 to emit a visual and auditory alert. The processor 126 transmits images from the camera 128 to the supervisor computer system 130. In some fluid pit safety systems, the images captured by the camera are analyzed to determine the location of the person immersed in the fluid pit. To deploy the rescue device 108, the first motor 146 rotates in the first direction to move the first end 148 of the rescue device towards the surface. The motor 146 continues to rotate in the first direction until the rescue device 108 is able to bear the weight of the immersed person (about 225-250 lbs). In some cases, the first end of the rescue device is attached to multiple motors, so that the maximum load of the rescue device is increased. The first end 148 of the rescue device is adjacent or above the edge 110 of the fluid pit 102.

A supervisor can cancel the first and second alarms 132, and 134 after rescuing the immersed person from the fluid pit 102. The processor 126 prompts the rescue sub-system 144 to rotate in the second direction, sinking the rescue device 108 to an initial position for reuse.

FIG. 6 is the fluid pit safety system 100 that includes multiple rescue devices 108. A rescue sub-system 290 is substantially similar to the rescue sub-system 144, however, the rescue subsystem 190 has multiple rescue device 108 and multiple motors 146. The second ends 150 of each of the rescue devices 108 are releasably attachable to the anchor 149. Some rescue sub-systems have additional rescue devices, for example 3, 4, 5, 6, 7, or 8 rescue devices.

The rescue sub-system 190 operates similarly to the rescue sub-system 144, however, the rescue sub-system 190 deploys the rescue device closest to the immersed victim. For example, in response to receiving the perimeter disruption signal and the water height change signal, the processor prompts the camera to capture images of the mud pit. The processor then processes the images and determined the location of the immersed victim relative to the anchor and determines the closest rescue device to the immersed victim. If the immersed victim is equidistant from both rescue devices, the rescue sub-system deploys both rescue devices. The motors continue to rotate in the first direction until the rescue devices are able to bear the weight of the immersed victim. The first ends of the rescue devices are adjacent or above the edge of the fluid pit.

In some fluid pit safety systems, the rescue device spans the width of the fluid pit. In some fluid pit safety systems the rescue device spans the length of the fluid pit.

While a rescue sub-system with a single motor has been previously described, some rescue sub-systems include a first motor attached to the first end of the rescue device and a second motor attached to a second end of the rescue device. The rescue device has three deployed positions. A first deployed position in which the first end of the rescue device is adjacent the edge of the fluid pit, a second deployed position in which the second end of the rescue device is adjacent the edge of the fluid pit, and a third deployed device in which the first and the second ends of the rescue device are adjacent the edge of the fluid pit. In such an embodiment, the rescue device can be flexible (e.g., a net) or rigid (e.g., a pole). In such an embodiment, the rescue sub-system does not include an anchor.

Figure 7C:
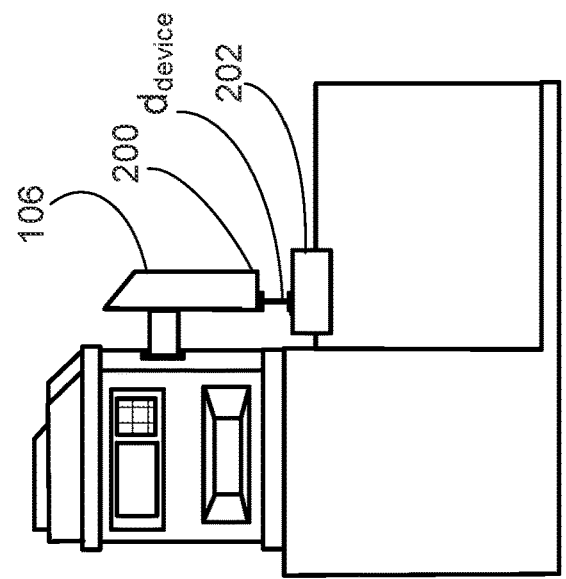
FIGS. 7A-7C are schematic views of a fluid height sensor with a float device.
Figure 7B:
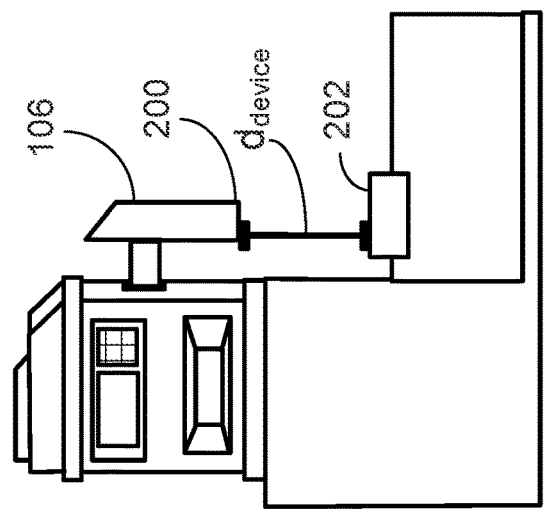
Figure 7A:
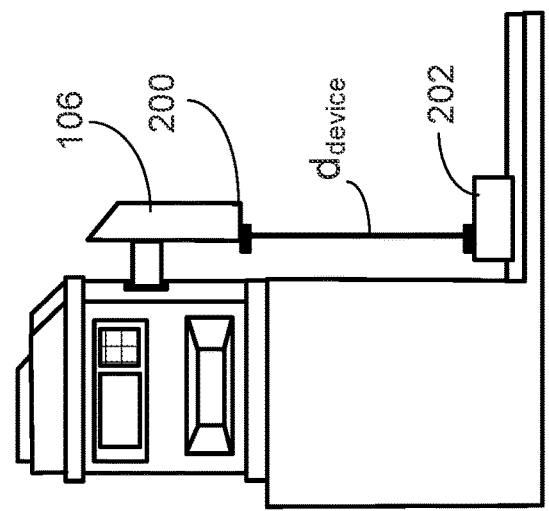

FIGS. 7A-7C are schematic views of a fluid height sensor 200 of the fluid pit safety system 100 with a float device 202. The fluid height sensor 200 is substantially similar to the fluid height sensor 136, however, the fluid height sensor 200 uses the float device 202 as the target surface of the ultrasonic sensor, rather than the surface of the fluid in the fluid pit 102 or the floor 137 of the fluid pit 102. The fluid height sensor 200 can be any sensor for measuring the proximity of an object, for example infrared triangulation sensors, laser sensors, Time-of-Flight sensors, magnetic field sensors, or ultrasound sensors. FIG. 7A shows the float device 202 at a low fluid level, FIG. 7B shows the float device at a normal fluid level, and FIG. 7C shows the float device 202 at a high fluid level. The float device 202 is made of a buoyant material, for example a polymer substance or rubber. The float device is anchored to the floor 137 of the fluid pit 102, e.g., by a retractable tether (not shown) that prevents the float device 202 from moving out of the range of the fluid height sensor 200. The tether can extend when pulled by the float device 202, for example, when the water level rises.

In use, the fluid height sensor 200 emits a series of ultrasonic waves 140a over a period of time (e.g., 1 second, 3 seconds, 5 seconds, 10 seconds, 15 second, 20 seconds, 30 seconds) when prompted by the processor 126 to take float device distance measurements. The reflected waves 140b reflect off the float device 202 and are received by the fluid height sensor 200. The data generated by the fluid height sensor 200 is evaluated and/or analyzed to determine if a sensed float device distance $d_{device}$ or a change in float device distance $\Delta d_{device}$. The float device distance $d_{device}$ is inversely proportional to the fluid height $h_{fluid}$ of the fluid in the fluid pit 102, whereas the change in the float device distance $\Delta d_{device}$ fluid height is equal to the change in fluid height $\Delta h_{fluid}$ of the fluid in the fluid pit 102. The float device distance $\Delta d_{device}$ and/or change in float device distance $\Delta d_{device}$ are compared to a predetermined threshold (e.g., a float device distance that is greater than 3 ft, 4 ft, 5 ft, 6 ft, 7 ft, 8 ft, 9 ft, or 10 ft; or a change in float device distance that is more than 1 inch, 2 inches, 3 inches, or 4 inches). The predetermined thresholds account for changes in fluid height due to various environmental stimuli, for example vibrations due to adjacent drilling equipment or wind.

A large float device distance $d_{device}$, e.g., 4 ft to 6 ft, indicates that the float device 202 is far from the fluid height sensor 200 and that the fluid height $h_{fluid}$ is low, as shown in FIG. 7A. A normal float device distance $d_{device}$, e.g., 2 ft to 4 ft, indicates that the float device 202 is a standard distance from the fluid height sensor 200 and that the fluid height $h_{fluid}$ is normal, as shown in FIG. 7B. A small float device distance $d_{device}$, e.g., 0ft to 2 ft, indicates that the float device 202 is close to the fluid height sensor 200 and that the fluid height $h_{fluid}$ is high, as shown in FIG. 7C.

If the fluid height sensor 200 detects a small float device distance $d_{device}$ (high fluid height), when the fluid height sensor 200 is prompted by the processor 126, the fluid height sensor 200 transmits a high fluid level signal to the processor 126. With the high fluid level signal from the fluid height sensor 200, and the perimeter disruption signal from the perimeter detection sub-system 104, the processor 126 can infer that a drowning incident is occurring and prompts the rescue sub-system 144 to deploy the rescue device 108.

The fluid height sensor 200 can also determine the change in float device distance $\Delta d_{device}$, rather than or in addition to the float device distance $d_{device}$. The fluid height sensor 200 emits a series of ultrasonic waves 140a over a period of time (e.g., 3 seconds) when prompted by the processor 126 to take float device distance measurements. As previously described, the fluid height sensor 200 determines the distance between the float device and the fluid height sensor 200 (float device distance $d_{device}$). The fluid height sensor 200 can further process the data generated by fluid height sensor 200 and compare changes in float device distance $\Delta d_{device}$ over time.

The fluid height sensor 200 may detect a change in float device distance $\Delta d_{device}$, for example the float device distance $d_{device}$ taken at 1 second may be less that the float device distance $d_{device}$ taken at 2 seconds over the 3 second time period. This change in float device distance $\Delta d_{device}$ is equal to the change in fluid height $\Delta h_{fluid}$. The difference between the largest float device distance $d_{device}$ measured over the time period and the smallest float device distance $d_{device}$ measured over the time period is compared to a threshold. The threshold may be 2 in, 3 in, 4 in, 5 in, or 6 in. If the difference is less than the threshold, the change in fluid height $\Delta h_{fluid}$ is decidedly negligible and may be, for example, small waves caused by wind. If the difference is at or greater than the threshold, the change in fluid height $\Delta h_{fluid}$ is significant and indicates that a large object (e.g., a drowning victim) has fallen in the fluid pit 102. The fluid height sensor 200 transmits a fluid level change signal to the processor 126.

With the fluid level change signal from the fluid height sensor 200, and the perimeter disruption signal from the perimeter detection sub-system, the processor 126 can infer that a drowning incident is occurring and prompts the rescue sub-system 144 to deploy the rescue device 108.

While the field deflectors of the perimeter detection sub-system have been described as light guides, some field deflectors are light detectors attached to light beam emitters. The perimeter detection sub-system further includes a power source for each field deflector and a wireless connection to the processor. The field deflectors each include a light beam detector and a light emitter. The light emitters can be arranged at an angle relative to the light beam detector so that the emitted light beam follows the edge of the fluid pit. The light beam detectors are configured to detect a beam of light from a light emitter of a different field deflector or from the light emitter of the perimeter detection sub-system.

An exemplary method of a perimeter detection sub-system with two field deflectors (a first and second field detector) is described, however, the method can be applied to a perimeter detection sun-system with more than two field deflectors, e.g., three to thirty field deflections. In use, the perimeter detection sub-system emits a first light beam using the light emitter of the perimeter detection sub-system. The first emitted light beam is received by a light beam detector of a first field deflector. The first field deflector then transmits a perimeter maintained signal to the processor indicating that the first light beam has been received. Regardless of the detection of the first light beam, the first field deflector emits second light beam using a light emitter of the first deflector. The second light beam is received by a light beam detector of a second field deflector. The second field deflector transmits a perimeter maintained signal to the processor indicating that the second light beam has been received. Regardless of the detection of the second light beam, the second field deflector emits third light beam using a light emitter of the second deflector. The light detector of the perimeter detection sub-system receives the third light beam and transmits a perimeter maintained signal to the processor indicating that the third light beam has been detected. The perimeter is defined by the first, second, and third light beams.

If any of the first, second, or third light beams are broken (e.g., by a person crossing the perimeter) the light detectors of the first field detector, second field detector, or perimeter detection sub-system, respectively, do not detect the first, second, or third light beam. As a result, the light beam detector that did not detect a light beam transmits a perimeter disruption signal to the processor.

The processor, upon receiving perimeter maintained signals from all light beam detectors, can infer that the perimeter has not been disrupted. If one or more of the light beam detectors transmit a perimeter disruption signal, the processor can infer that the perimeter was disrupted between the signaling light detector and the preceding light emitter. For example, if the light beam detector of the second field deflector did not detect a light beam, the perimeter disruption can be inferred to occur between the first field deflector and the second field deflector.

This configuration can indicate with greater accuracy where the perimeter was disrupted and the area in which the drowning victim fell in. In response, a system with multiple rescue devices, may deploy the device closest to the light detector that sensed the light beam disruption and/or the light emitter that produced the disrupted light beam. The camera may also point to the indicated area first when transmitting images to the supervisor display.

While a rescue sub-system has been described as having a rescue device movable by a motor, some rescue devices are flotation devices. In such an embodiment, the rescue sub-system includes a rescue device retainer, for example a hook arranged on the floor of the fluid pit. The flotation device may be arranged on the floor of the fluid pit retained in the retainer. To deploy the rescue device, the rescue sub-system releases the retainer and the flotation device rises to the surface of the fluid.

In some rescue systems, the rescue device may be arranged at the edge of the fluid pit. The rescue sub-system includes a spring releasably attached to the rescue device, held in a tensioned position. To deploy the rescue device the spring is released and the rescue device is thrust to the surface of the fluid pit due to a force of the relaxing spring. In some embodiments the processor aims the spring toward the location of the immersed victim.

A number of embodiments have been described. Nevertheless, it will be understood that various modifications may be made without departing from the spirit and scope of the disclosure.

What is claimed is:

1. A fluid pit safety system to prevent drowning incidents in a fluid pit, the system comprising:
   a plurality of sensors spatially disposed adjacent the fluid pit, the plurality of sensors configured to detect a change in fluid height in the fluid pit filled with a fluid;
   a perimeter detection sub-system defining a perimeter arranged around an edge of the fluid pit, the perimeter detection sub-system configured to detect a disruption in the perimeter,
   a rescue device arranged in the fluid pit, the rescue device configured to move towards a surface of the fluid in the fluid pit in response to the plurality of sensors detecting the change in the fluid height in the fluid pit and the perimeter detection sub-system detecting the disruption in the perimeter; and
   a computer system operatively coupled to the plurality of sensors, the perimeter detection sub-system and the rescue device, the computer system comprising:
   one or more processors; and
   a non-transitory computer-readable medium storing instructions executable by the one or more processors to perform operations comprising:
   receiving a first signal from the plurality of sensors in response to the change in the fluid height in the fluid pit;
   receiving a second signal from the perimeter detection sub-system in response to detecting the disruption in the perimeter; and
   actuating a rescue sub-system connected to the rescue device to move the rescue device towards the surface of the fluid in the fluid pit.

2. The fluid pit safety system according to claim 1, wherein rescue sub-system comprises a first motor connected to a first end of the rescue device.

3. The fluid pit safety system according to claim 2, wherein a second end of the rescue device is attached to an anchor arranged on a floor of the fluid pit.

4. The fluid pit safety system according to claim 2, wherein the first motor is configured to rotate in a first direction such that the first end of the rescue device moves axially within the fluid pit.

5. The fluid pit safety system according to claim 2, wherein the rescue sub-system comprises a second motor connected to a second end of the rescue device.

6. The fluid pit safety system according to claim 5, wherein the second motor is configured to rotate in a first direction such that the second end of the rescue device moves axially within the fluid pit.

7. The fluid pit safety system according to claim 1, wherein the rescue device is a net.

8. The fluid pit safety system according to claim 1, wherein a rescue sub-system comprises a plurality of rescue devices.

9. The fluid pit safety system according to claim 1, wherein the perimeter detection sub-system comprises:
   at least one light emitter configured to emit a light beam;
   a plurality of field deflectors configured to direct the light beam, wherein the plurality of field deflectors are arranged around the edge of the fluid pit; and
   at least one light beam detector configured to detect the light beam.

10. The fluid pit safety system according to claim 9, wherein the light beam detector is configured to detect the disruption of the perimeter in response to detecting an absence of the light beam emitted by the light emitter.

11. The fluid pit safety system according to claim 1, wherein the plurality of sensors comprises a fluid height sensor arranged above the surface of the fluid in the fluid pit.

12. The fluid pit safety system according to claim 11, wherein the fluid height sensor is configured to detect an increase or decrease in the fluid height.

13. The fluid pit safety system according to claim 11, wherein the fluid height sensor is an ultrasonic sensor.

14. The fluid pit safety system according to claim 1, wherein the plurality of sensors comprises gas detectors arranged above the surface of the fluid pit.

15. The fluid pit safety system according to claim 14, wherein the gas detectors are configured to sense concentrations of at least one of:
   (a) hydrogen sulfide; and
   (b) hydrocarbon gas.

16. The fluid pit safety system according to claim 1, further comprising a camera configured to capture images of the fluid pit.

17. The fluid pit safety system according to claim 1, further comprising an alarm sub-system configured to notify an operator, wherein the alarm sub-system is operatively coupled to a processor.

18. The fluid pit safety system according to claim 17, wherein alarm sub-system comprises a first alarm and a second alarm.

19. A method for preventing a safety incident; the method comprising:
   detecting a state change of a perimeter detection arrangement arranged around an edge of a pit of fluid deploying a rescue device in a fluid pit filled with a fluid;
   detecting a change in fluid height using a plurality of sensors arranged above the fluid pit filled with the fluid, wherein detecting a state change of a perimeter detection arrangement arranged around the edge of the fluid pit comprises:
   generating a light emitter perimeter around an edge of the fluid pit; and detecting a break in the light emitter perimeter; and deploying a rescue device in the fluid pit in response to detecting the state change and in response to detecting the change in the fluid height.

20. The method according to claim 19, wherein deploying a rescue device in the fluid pit comprises detecting a location of an object in the fluid.

21. The method according to claim 20, wherein the location is detected using a camera.

22. The method according to claim 19, wherein deploying the rescue device in the fluid pit further comprises raising a first end of a rescue device such that the first end is adjacent an edge of the fluid pit.

23. The method according to claim 22, wherein a motor raises the first end of the rescue device.

24. The method according to claim 22, wherein the rescue device is a net.

25. The method according to claim 19, wherein deploying the rescue device in the fluid pit further comprises raising a first end of a plurality of rescue devices such that the first ends are adjacent an edge of the fluid pit.

26. The method according to claim 19, wherein detecting a state change of a perimeter detection arrangement arranged around the edge of the fluid pit comprises actuating a visual alarm.

27. The method according to claim 19, further comprising actuating an alarm to notify an operator of the safety incident.

28. The method according to claim 27, wherein the alarm is a visual alarm, an auditory alarm, or both a visual alarm and auditory alarm.

29. A fluid pit safety system to prevent drowning incidents in a fluid pit, the system comprising:

an ultrasonic sensor spatially disposed adjacent the fluid pit filled with a fluid, the ultrasonic sensor configured to detect a change in fluid height in the fluid pit;

a perimeter detection sub-system defining a perimeter arranged around an edge of the fluid pit, the perimeter detection sub-system configured to detect an object crossing the perimeter;

a rescue device arranged in the fluid pit, the rescue device comprising a net, wherein a first end of the net is configured to move towards a surface of the fluid in the fluid pit in response to the ultrasonic sensor detecting the change in the fluid height in the fluid pit and the perimeter detection sub-system detecting the disruption in the perimeter; and a computer system operatively coupled to the ultrasonic sensor, the perimeter detection sub-system and the rescue device, the computer system comprising:

one or more processors; and a non-transitory computer-readable medium storing instructions executable by the one or more processors to perform operations comprising:

receiving a first signal from the ultrasonic sensor in response to the change in the fluid height in the fluid pit;

receiving a second signal from the perimeter detection sub-system in response to detecting the disruption in the perimeter; and actuating a rescue sub-system connected to the rescue device to move the rescue device towards the surface of the fluid in the fluid pit.

\* \* \* \* \*